(12) United States Patent
Hiemstra et al.

(10) Patent No.: US 11,817,916 B2
(45) Date of Patent: Nov. 14, 2023

(54) SYSTEMS AND METHODS FOR ESTABLISHING RELIABLE WIRELESS LINKS

(71) Applicant: Apple Inc., Cupertino, CA (US)

(72) Inventors: Daniel J. Hiemstra, Mountain View, CA (US); Jorge L. Rivera Espinoza, San Jose, CA (US); Timothy B. Ogilvie, San Jose, CA (US); Timothy M. Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 17/328,694

(22) Filed: May 24, 2021

(65) Prior Publication Data

US 2021/0281291 A1    Sep. 9, 2021

Related U.S. Application Data

(63) Continuation of application No. 16/584,700, filed on Sep. 26, 2019, now Pat. No. 11,050,463.

(51) Int. Cl.
| | |
|---|---|
| *H04B 5/00* | (2006.01) |
| *H04B 1/034* | (2006.01) |
| *H01Q 1/27* | (2006.01) |
| *G04G 21/04* | (2013.01) |
| *H02J 50/10* | (2016.01) |
| *H02J 50/40* | (2016.01) |
| *H01Q 7/00* | (2006.01) |

(52) U.S. Cl.
CPC ........... *H04B 5/0037* (2013.01); *G04G 21/04* (2013.01); *H01Q 1/273* (2013.01); *H02J 50/10* (2016.02); *H02J 50/402* (2020.01); *H04B 1/0343* (2013.01); *H01Q 7/00* (2013.01); *H04B 5/0081* (2013.01)

(58) Field of Classification Search
CPC .. H04B 5/0037; H04B 1/0343; H04B 5/0081; H04B 1/385; G04G 21/04; H01Q 1/273; H01Q 7/00; H01Q 21/28; H02J 50/10; H02J 50/402; H02J 50/20; G04R 60/12
See application file for complete search history.

(56) References Cited

U.S. PATENT DOCUMENTS

| | | | | |
|---|---|---|---|---|
| 9,229,227 | B2* | 1/2016 | Border | G06Q 30/02 |
| 9,550,335 | B2* | 1/2017 | Cole | H04M 1/026 |
| 9,839,144 | B2* | 12/2017 | Chuang | H01Q 7/00 |

(Continued)

*Primary Examiner* — Ankur Jain
(74) *Attorney, Agent, or Firm* — Treyz Law Group, P.C.; Tianyi He

(57) ABSTRACT

A first device such as a wristwatch may include a front face at which a display is disposed and a rear face at which a rear housing wall is mounted. Antenna structures may overlap the rear housing wall and may be operable to transmit and receive relatively high frequency signals through the rear housing wall to a communication with a second device such as a wireless power transmitting device for the wristwatch. The second device may also include antenna structures that overlap a top surface housing. Respective sets of magnetic structures may be provided in the first and second devices to align the two devices and to form a reliable wireless communication link between the two devices. The first and second devices may include respective antenna arrays that include pairs of antenna elements that are selectively used to form a reliable wireless communication link.

20 Claims, 12 Drawing Sheets

(56) References Cited

U.S. PATENT DOCUMENTS

| | | | | |
|---|---|---|---|---|
| 10,088,865 | B1* | 10/2018 | Li | G06F 1/1635 |
| 10,283,845 | B2* | 5/2019 | Boerman | H01Q 1/42 |
| 10,389,007 | B1* | 8/2019 | Choi | H01Q 1/02 |
| 2014/0304094 | A1* | 10/2014 | Reddy | G02B 6/0088 |
| | | | | 705/16 |
| 2017/0110787 | A1* | 4/2017 | Ouyang | H01Q 1/42 |
| 2017/0205854 | A1* | 7/2017 | Zenoff | G06F 1/1639 |
| 2017/0309992 | A1* | 10/2017 | Noori | H01Q 13/06 |
| 2017/0325557 | A1* | 11/2017 | Bemis | A45C 11/00 |
| 2017/0346164 | A1* | 11/2017 | Kim | H04M 1/0266 |
| 2019/0020110 | A1* | 1/2019 | Paulotto | H01Q 5/20 |
| 2019/0089053 | A1* | 3/2019 | Yong | H01Q 1/38 |
| 2020/0103972 | A1* | 4/2020 | Amin-Shahidi | G06F 3/0346 |

* cited by examiner

SYSTEMS AND METHODS FOR ESTABLISHING RELIABLE WIRELESS LINKS

This application is a continuation application of U.S. patent application Ser. No. 16/584,700 filed on Sep. 26, 2019. This application claims the benefit of and claims priority to U.S. patent application Ser. No. 16/584,700, which is hereby incorporated by reference herein in its entirety.

BACKGROUND

This relates to electronic devices, and more particularly, to electronic devices with wireless circuitry.

Electronic devices are often provided with wireless communications capabilities. Because wireless circuitry such as antennas have the potential to interfere with each other and with other components in a wireless device, care must be taken when incorporating antennas into an electronic device to ensure that the antennas and other wireless circuitry are able to exhibit satisfactory performance over a wide range of operating frequencies.

In some applications, it is desirable to incorporate wireless circuitry that allows for relatively high rates of data transfer. However, operations of the wireless circuitry at relatively high frequencies, such as at frequencies of about 10-300 GHz, that allow for high data rate data transfer can raise significant challenges. As an example, signal polarization misalignment between communicating devices and directional misalignment between communicating devices often degrade wireless communication links between the communicating devices.

It would therefore be desirable to be able to provide improved wireless circuitry and interfacing circuitry for electronic devices.

SUMMARY

An electronic device, such as a wristwatch or a wireless power receiving device, may have front and rear faces. A display having a display cover glass may be disposed at the front face and a rear housing wall (e.g., rear housing member) may be disposed at rear face. One or more antenna resonating elements for an antenna may overlap the rear housing wall and that is operable to transmit radio-frequency signals through the rear housing wall. The one or more antenna resonating elements may for an antenna array for the electronic device. Radio-frequency transceiver circuitry (e.g., near-field communications circuitry) may be coupled to the one or more antenna resonating elements and may be operable to use the one or more antenna resonating elements to transmit radio-frequency signals above 10 GHz through the rear housing wall. If desired, the radio-frequency transceiver circuitry may be operable use only a subset of the antenna resonating elements in the antenna array and/or may be operable to use a pair of the antenna resonating elements in the antenna array at a time.

As an example, the one or more antenna resonating elements may be formed at a substrate in a backside circuitry module (e.g., a sensor module). The radio-frequency transceiver circuitry may be mounted to the substrate. As another example, the one or more antenna resonating elements may be formed at a printed circuit substrate to which the radio-frequency transceiver circuitry and control circuitry that controls an operation of the radio-frequency transceiver circuitry are mounted. As yet another example, an additional antenna resonating element for an additional antenna may overlap the rear housing wall and may be operable to transmit additional radio-frequency signals through the rear housing wall. The one or more antenna resonating elements may be aligned with one or more corresponding antenna apertures defined at least in part by the additional antenna resonating element.

If desired, the antenna resonating elements in the antenna array may overlap the rear housing wall along in a circumferential path about a central axis of the wristwatch. As an example, the rear housing wall has a protruding portion and the circumferential path may overlap the protruding portion. As another example, the rear housing wall may have a planar portion and the circumferential path may overlap the protruding portion.

In some embodiments, alignment structures may be disposed at the rear housing wall and may be configured to apply a force through the rear housing wall. The alignment structures may include first and second magnetic structures that apply magnetic forces through the rear housing wall. The first and second magnetic structures may be configured to bias the rear housing wall to equipment external to the electronic device (e.g., a wireless power transmitting device) and to align the antenna resonating element to the external equipment. The attachment structures may have first and second portions (e.g., the first and second magnetic structures), and the sensor module and coil structures are interposed between the first and second portions of the attachment structures.

The electronic device may wirelessly communicate with wireless power transmitting equipment. The wireless power transmitting equipment may include a housing, a coil structure, wireless power transmitting circuitry coupled to the coil structures and configured to use the coil structure to convey wireless power signals through a portion of the housing. The wireless power transmitting equipment may also include a plurality of antenna elements for an antenna array useable by radio-frequency transceiver circuitry to convey radio-frequency signals above 10 GHz through the portion of the housing.

As an example, the antenna array may be operable to sequentially use respective antenna elements in pairs of antenna elements in the plurality of antenna elements at a time to receive additional radio-frequency signals. Control circuitry may be configured to receive wireless performance information based on the additional radio-frequency signals received from the respective antenna elements in the pairs of antenna elements. The control circuitry may be operable to select one or more antenna elements in the plurality of antenna elements for conveying the radio-frequency signals based on the received wireless performance information.

DETAILED DESCRIPTION

Figure 1:
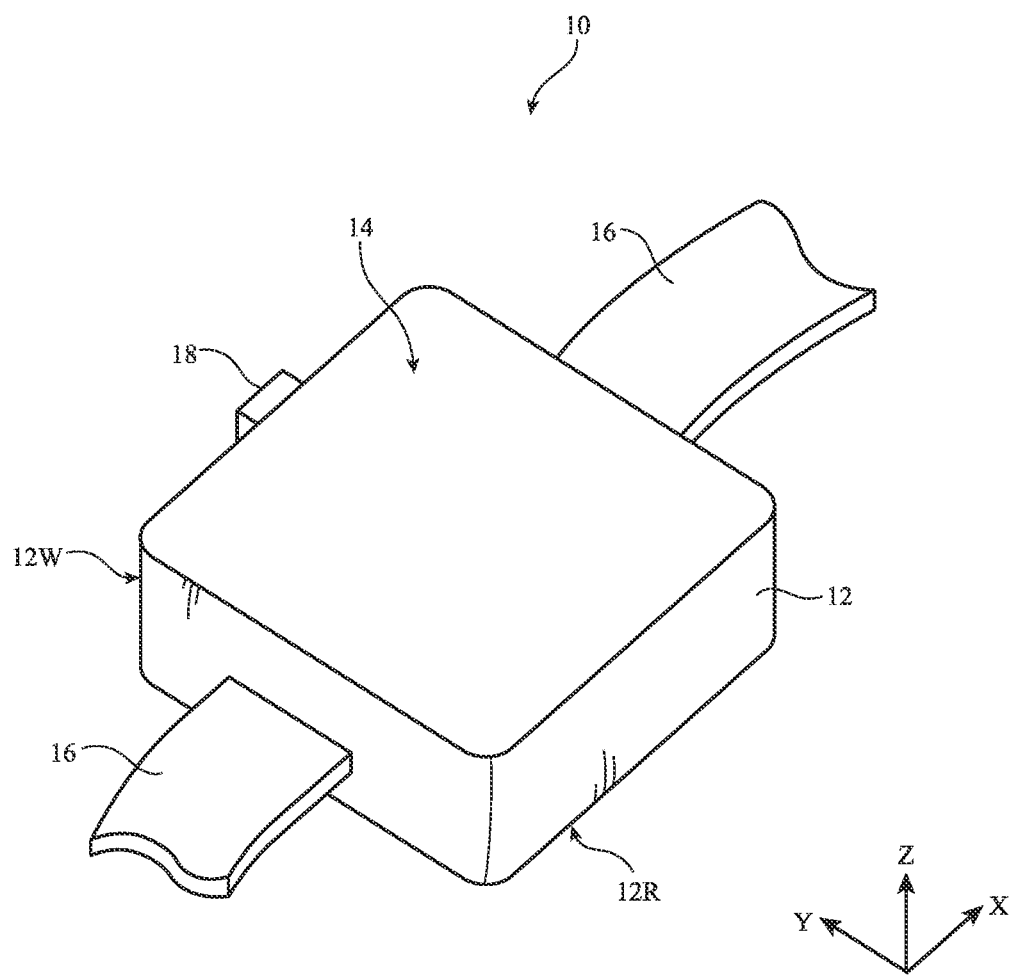
FIG. 1 is a perspective view of an illustrative electronic device with wireless circuitry in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, wireless personal area network communications bands, near-field communications bands, ultra-wideband communications bands, centimeter wave communications bands, millimeter wave communications bands, or other wireless communications bands.

The wireless circuitry may include one or more antennas. The antennas of the wireless circuitry can include loop antennas, inverted-F antennas, strip antennas, planar inverted-F antennas, patch antennas, slot antennas, monopole antennas, dipole antennas, hybrid antennas that include antenna structures of more than one type, or other suitable antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to the Z-axis of FIG. 1). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Configurations that do not include straps may also be used for device 10.

Figure 2:
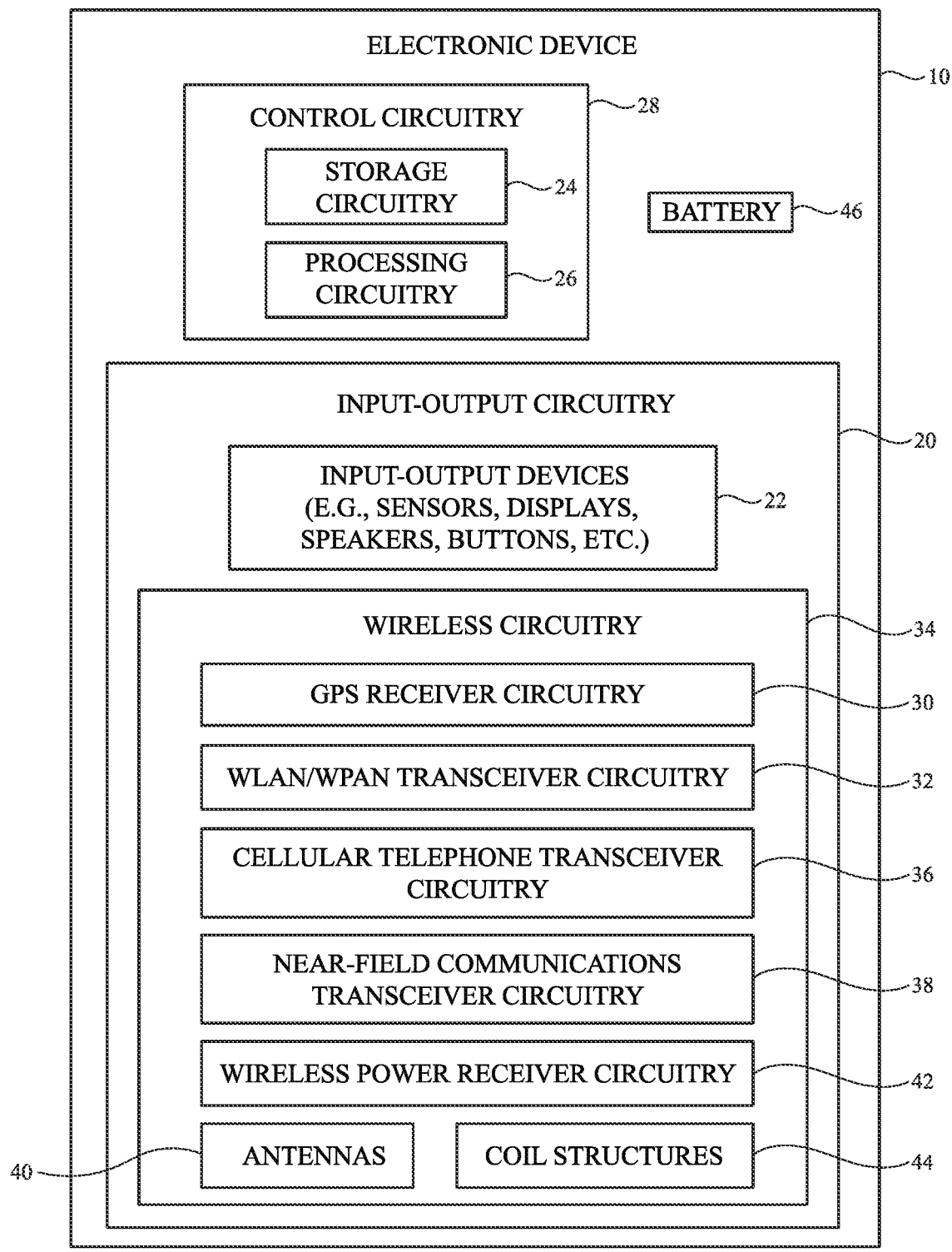
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, data transfer protocols, etc. Each communications protocol may be associated with a corresponding radio access technology (RAT) that specifies the physical connection methodology used in implementing the protocol.

Data transfer protocols handled by control circuitry 28 (sometimes referred to herein as data bus protocols) may be used to perform high data rate data transfer operations (e.g., data transfer operations at speeds of 100 Megabits per second (Mbps) or more, at 500 Mbps or more, 1 bit per second or more, etc.). Data transfer protocols that may be implemented by control circuitry 28 may include Universal Serial Bus (USB) protocols, universal asynchronous receiver/transmitter (UART) protocols, Peripheral Component Interconnect (PCI) protocols, Peripheral Component Interconnect Express (PCIe) protocols, Accelerated Graphics Port (AGP) protocols, or any other desired data transfer protocols capable of data speeds (i.e., data rates) of greater than or equal to approximately 100 Mbps.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices (e.g., test port devices), and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include radio-frequency (RF) transceiver circuitry formed from one or more integrated circuits, power amplifier circuitry, low-noise input amplifiers, passive RF components, one or more antennas such as antenna(s) 40, transmission lines, and other circuitry for handling RF wireless signals. Wireless signals can also be sent using light (e.g., using infrared communications).

Wireless circuitry 34 may include radio-frequency transceiver circuitry for handling various radio-frequency communications bands. For example, wireless circuitry 34 may include wireless local area network (WLAN) and wireless personal area network (WPAN) transceiver circuitry 32. Transceiver circuitry 32 may handle 2.4 GHz and 5 GHz bands for WiFi® (IEEE 802.11) communications or other WLAN bands and may handle the 2.4 GHz Bluetooth® communications band or other WPAN bands. Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies (as examples). Cellular telephone transceiver circuitry 36 may handle voice data and non-voice data.

Wireless circuitry 34 may include satellite navigation system circuitry such as Global Positioning System (GPS) receiver circuitry 30 for receiving GPS signals at 1575 MHz or for handling other satellite positioning data (e.g., GLONASS signals at 1609 MHz). Satellite navigation system signals for receiver circuitry 30 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), etc.

In some configurations that are sometimes described herein as an example, near-field communications circuitry 38 may include transceiver circuitry operable at frequencies above about 10 GHz (e.g., at frequencies between about 10 GHz and 300 GHz), and are sometimes referred to herein as millimeter/centimeter wave transceiver circuitry. The millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As an example, near-field communications circuitry 38 may include millimeter/centimeter wave transceiver circuitry operable at about 60 GHz (or any frequency in a millimeter/centimeter wave frequency band) to establish a wireless link useable for data transfer operations (e.g., between device 10 as a wristwatch and a computer, between device 10 as a wristwatch and another electronic device, between device 10 as a first electronic device and a second electronic device, etc.). If desired, near-field communications circuitry 38 may include radio-frequency transceiver circuitry operable at a frequency lower than 10 GHz to establish a wireless link usable for data transfer. In some configurations, non-near-field communications circuitry may be used to support communications in Extremely High Frequency (EHF) or millimeter wave communications bands between about 30 GHz and 300 GHz and/or in centimeter wave communications bands between about 10 GHz and 30 GHz. Wireless data transfer protocols may be used by transceiver circuitry 38 to bidirectionally transfer data at these frequencies.

In NFC links, wireless signals are typically conveyed over a few inches at most (e.g., less than five inches, less than four inches, less than three inches, etc.). In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Wireless circuitry 34 may include antennas 40. Antennas 40 may be formed using any suitable antenna types. For example, antennas 40 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas or reflector-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna 40 in device 10 may be used to handle communications in a WiFi® or Bluetooth® communication band at 2.4 GHz, a GPS communications band at 1575 MHz, a WiFi® or Bluetooth® communications band at 5.0 GHz, and one or more cellular telephone communications bands such as a cellular low band between about 600 MHz and 960 MHz and/or a cellular midband between about 1700 MHz and 2200 MHz. If desired, a combination of antennas for covering multiple frequency bands and dedicated antennas for covering a single frequency band may be used.

It may be desirable to implement at least some of the antennas in device 10 using portions of electrical components that would otherwise not be used as antennas and that support additional device functions. As an example, it may be desirable to induce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

Figure 3:
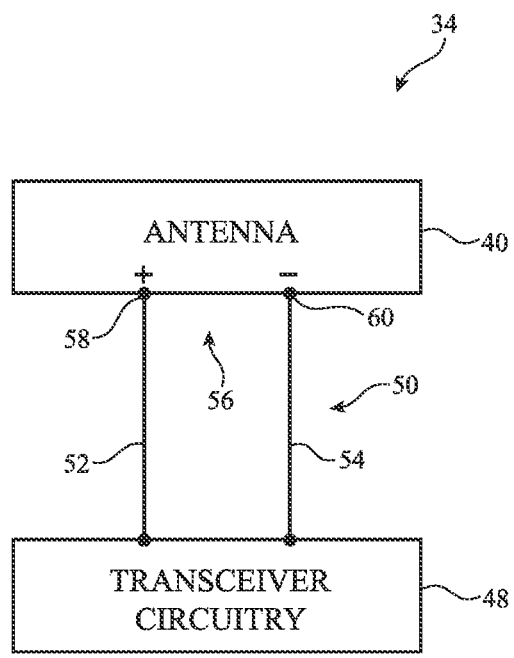
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32 of FIG. 2, near-field communications transceiver circuitry 36 of FIG. 2, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, a dipole antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

Device 10 may include multiple antennas that convey radio-frequency signals through different sides of device 10. For example, device 10 may include at least a first antenna that conveys radio-frequency signals through the front face of device 10 (e.g., through display 14 of FIG. 1) and a second antenna that conveys radio-frequency signals through the rear face of device 10 (e.g., through rear housing wall 12R of FIG. 1).

Figure 4:
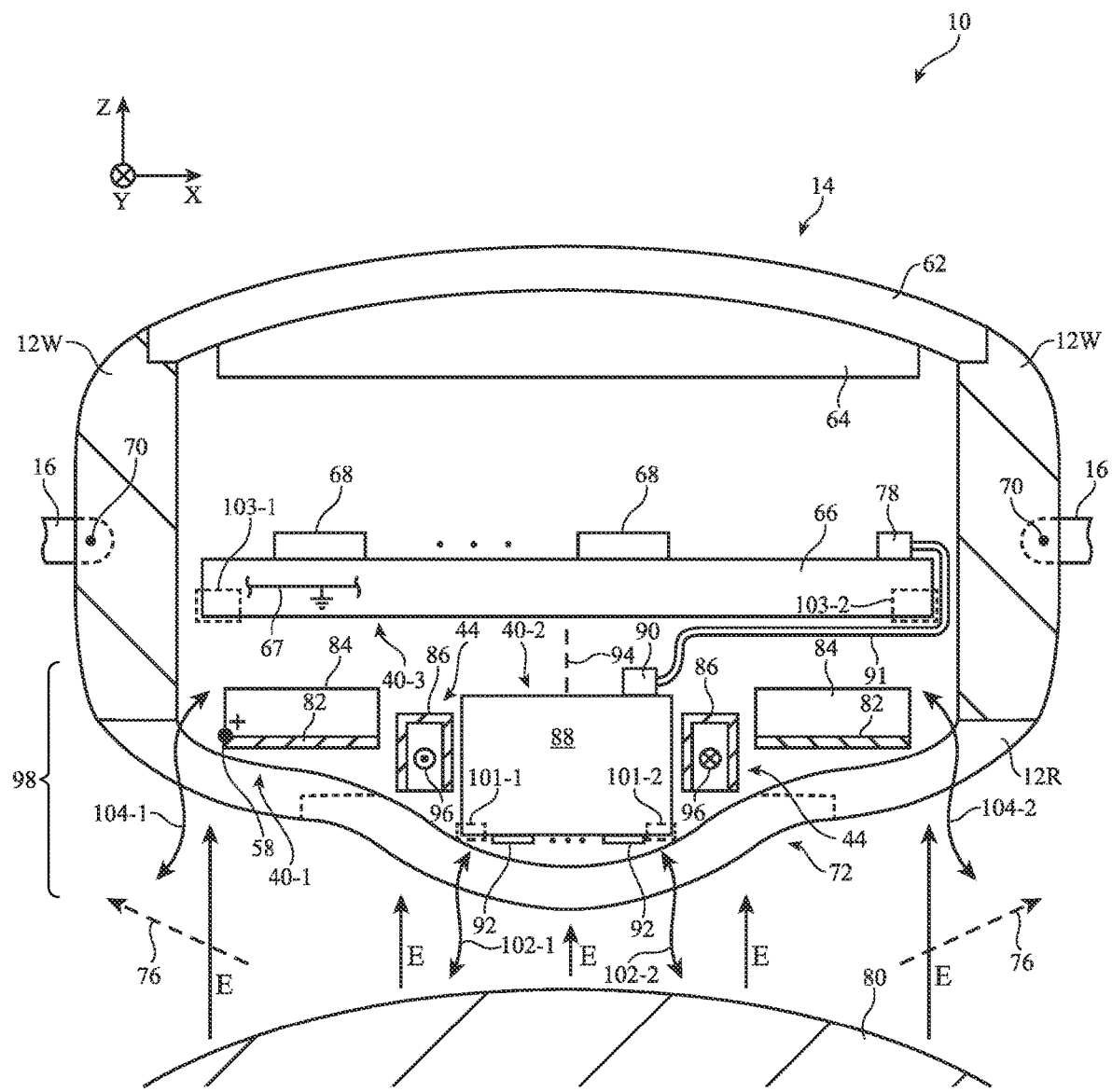
FIG. 4 is a cross-sectional side view of an illustrative electronic device having antenna elements overlapping a rear housing wall in accordance with some embodiments.

FIG. 4 is a cross-sectional side view of electronic device 10 showing how one or more antennas may be mounted within device 10 for conveying (radiating) radio-frequency signals through rear housing wall 12R. As shown in FIG. 4, display 14 may form the front face of device 10 whereas rear housing wall 12R forms the rear face of device 10. In the example of FIG. 4, rear housing wall 12R is formed from a dielectric material such as glass, sapphire, ceramic, or plastic. This is merely illustrative and, if desired, rear housing wall 12R may also include conductive portions (e.g., a conductive frame surrounding one or more dielectric windows in rear housing wall 12R, conductive cosmetic layers, etc.). Conductive housing sidewalls 12W may extend from the rear face to the front face of device 10 (e.g., from rear housing wall 12R to display 14).

Strap 16 may be secured to conductive housing sidewalls 12W using corresponding attachment structures 70. Attachment structures 70 may include lugs, spring structures, clasp structures, adhesive structures, or any other desired attachment mechanisms. Strap 16 may be formed using any desired materials (e.g., metal materials, dielectric materials, or combinations of metal and dielectric materials). If desired, strap 16 may be removed from attachment structures 70 (e.g., so that a user of device 10 can swap in different straps having similar or different materials).

Display 14 may include a display module 64 (sometimes referred to herein as display stack 64, display assembly 64, or active area 64 of display 14) and a display cover layer 62. Display module 64 may, for example, form an active area or portion of display 14 that displays images and/or receives touch sensor input. The lateral portion of display 14 that does not include display module 64 (e.g., portions of display 14 formed from display cover layer 62 but without an underlying portion of display module 64) may sometimes be referred to herein as the inactive area or portion of display 14 because this portion of display 14 does not display images or gather touch sensor input.

Display module 64 may include conductive components (sometimes referred to herein as conductive display structures) that are used in forming portions of an antenna that radiates through the front face of device 10 (e.g., an antenna having a radiating element such as a radiating slot element defined by display module 64 and/or conductive housing sidewalls 12W). The conductive display structures in display module 64 may, for example, have planar shapes (e.g., planar rectangular shapes, planar circular shapes, etc.) and may be formed from metal and/or other conductive material that carries antenna currents for a front-facing antenna in device 10. The conductive display structures may include a frame for display module 64, pixel circuitry, touch sensor electrodes, an embedded near-field communications antenna, etc.

Display cover layer 62 may be formed from an optically transparent dielectric such as glass, sapphire, ceramic, or plastic. Display module 64 may display images (e.g., emit image light) through display cover layer 62 for view by a user and/or may gather touch or force sensor inputs through display cover layer 62. If desired, portions of display cover layer 62 may be provided with opaque masking layers (e.g., ink masking layers) and/or pigment to obscure the interior of device 10 from view of a user.

Substrates such as substrate 66 (e.g., a rigid or flexible printed circuit board, integrated circuit or chip, integrated circuit package, etc.) may be located within the interior of device 10. Substrate 66 may be, for example, a main logic board (MLB) or other logic board for device 10. Other components such as components 68 (e.g., components used in forming control circuitry 28 and/or input-output circuitry 20 of FIG. 2, battery 46, etc.) may be mounted to substrate 66 and/or elsewhere within the interior of device 10.

As shown in FIG. 4, a given (first) antenna 40-1 may be mounted within device 10 for radiating through rear housing wall 12R. Ground traces 67 may be formed on substrate 66 and may form part of the antenna ground for antenna 40-1. Conductive housing sidewalls 12W may also form part of the antenna ground for antenna 40-1 (e.g., ground traces 67 on substrate 66 may be electrically shorted to conductive housing sidewalls 12W). Conductive portions of other components in device 10 may also form part of the antenna ground for antenna 40-1 (e.g., ground traces 67 on substrate 66, conductive housing sidewalls 12W, and/or conductive portions of other components in device 10 may be held at a ground or reference potential).

Antenna 40-1 may include an antenna resonating element 82 formed from conductive traces on a substrate such as substrate 84. Substrate 84 may be a plastic substrate, a flexible printed circuit substrate, a rigid printed circuit substrate, a ceramic substrate, or any other desired dielectric substrate. The conductive traces in antenna resonating element 82 (sometimes referred to herein as antenna radiating element 82, resonating element 82, radiating element 82, or antenna element 82) may, for example, be patterned onto substrate 84 using a laser direct structuring (LDS) process. In another suitable arrangement, antenna resonating element 82 may be formed from metal foil, layers of sheet metal, conductive portions of the housing for device 10, etc.

Antenna resonating element 82 may be a patch antenna resonating element, an inverted-F antenna resonating element, a planar inverted-F antenna resonating element, a monopole resonating element, a dipole resonating element, a loop resonating element, another type of antenna resonating element, and/or a combination of these types of antenna resonating elements. If desired, antenna resonating element 82 and/or substrate 84 may laterally extend circumferentially around central axis 94 (e.g., antenna resonating element 82 may lie within a given plane or surface and may have a loop shape that extends around an opening, where central axis 94 runs orthogonally through the opening). Positive antenna feed terminal 58 for antenna 40-1 may be coupled to antenna resonating element 82. The ground antenna feed terminal for antenna 40-1 (not shown in FIG. 4 for the sake of clarity) may be coupled to conductive housing sidewalls 12W, ground traces 67 on substrate 66, or any other desired portion of the antenna ground for antenna 40-1.

Rear housing wall 12R may extend across substantially all of the length and width of device 10 (e.g., in the X-Y plane). Rear housing wall 12R may be optically opaque or optically transparent or may include both optically opaque and optically transparent portions (e.g., rear housing wall 12R may include optically transparent windows in an otherwise optically opaque member). Antenna resonating element 82 may overlap rear housing wall 12R and may, if desired, be spaced apart from rear housing wall 12R, pressed against rear housing wall 12R, adhered to rear housing wall 12R, etc. In this way, antenna 40-1 may be formed at or adjacent to the rear face of device 10 for radiating through rear housing wall 12R. If desired, antenna resonating element 82 may conform to the shape of the interior surface of rear housing wall 12R (e.g., antenna resonating element 82 need not be planar). In the example of FIG. 4, the interior surface of rear housing wall 12R has a slightly curved or concave shape (e.g., to form a protruding portion 72 that increases the total volume for components within device 10 relative to scenarios where the interior surface of rear housing wall 12R is flat).

Antenna 40-1 may transmit and receive radio-frequency signals (e.g., in at least the cellular low band, the cellular low-midband, the cellular midband, and/or the cellular high band) through rear housing wall 12R. The radio-frequency signals transmitted by antenna 40-1 may be shielded from electrical components 68 and the antenna at the front face of device 10 by ground traces 67 on substrate 66, for example.

Similarly, ground traces 67 and substrate 66 may shield antenna 40-1 from components 68 and the antenna at the front face of device 10, thereby maximizing isolation between the antennas in device 10 despite the relatively small size of device 10.

By forming antenna 40-1 at rear housing wall 12R, the vertical height of device 10 (e.g., parallel to the Z-axis of FIG. 4) may be shorter than would otherwise be possible in scenarios where the corresponding antenna resonating element is located elsewhere on device 10 (while still allowing antenna 40-1 to exhibit satisfactory antenna efficiency). As an example, the vertical height of device 10 may be less than or equal to 11.4 mm, less than 15 mm, between 8 and 11.4 mm, or any other desired height while still allowing antenna 40-1 to operate with satisfactory antenna efficiency.

In practice, the wireless performance of antenna 40-1 may be optimized by the presence of an external object adjacent to rear housing wall 12R. For example, the presence of the user's wrist 80 adjacent to rear housing wall 12R when the user is wearing device 10 may enhance the wireless performance of antenna 40-1. During operation, antenna 40-1 may transmit and/or receive radio-frequency signals having electric fields (E) that are oriented normal to the surfaces of rear housing wall 12R and wrist 80. These signals may sometimes be referred to as surface waves, which are then propagated along the surface of wrist 80 and outwards, as shown by paths 76 (e.g., antenna resonating element 82 and wrist 80 may serve as a waveguide that directs the surface waves outwards). This may allow the radio-frequency signals conveyed by antenna 40-1 to be properly received by external communications equipment (e.g., a wireless base station) even though antenna 40-1 is located close to wrist 80 and typically pointed away from the external communications equipment.

Coil structures 44 may also be mounted within device 10 at or adjacent to rear housing wall 12R. Coil structures 44 may be spaced apart from rear housing wall 12R, pressed against rear housing wall 12R, adhered to rear housing wall 12R, etc. As shown in FIG. 4, antenna 40-1 (e.g., antenna resonating element 82) may laterally extend around (surround) coil structures 44 (e.g., coil structures 44 may lie within an opening in antenna resonating element 82). Coil structures 44 may also circumferentially surround central axis 94 (e.g., coil structures 44 may laterally extend around central axis 94 within the X-Y plane or another surface). In this way, coil structures 44 and antenna 40-1 may extend concentrically around central axis 94. Coil structures 44 may laterally surround module 88 and/or an opening that overlaps module 88.

Coil structures 44 may receive wireless charging signals through rear housing wall 12R (e.g., when device 10 is placed on a wireless power adapter or other wireless power transmitting device). The wireless charging signals may induce currents on coil structures 44 that are used by wireless power receiver circuitry 42 for charging battery 46 (FIG. 2). Coil structures 44 may include a single conductive coil (e.g., an inductive coil) or more than one conductive coil. In one suitable arrangement, coil structures 44 may include a first coil with windings that coil (wind) around central axis 94 and a second coil with windings that extend perpendicular to the windings in the first coil. The second coil may, for example, include windings that coil (wind) around axis 94 (e.g., a ring-shaped axis that loops around central axis 94 and lies within the X-Y plane). The windings in the first and second coils may include conductive wire (e.g., copper wire), conductive traces, or any other desired conductive material.

Coil structures 44 may include ferrite structures such as ferrite structures 86. Ferrite structures 86 may include ferrite shield structures that help to electromagnetically shield coil structures 44 from other components in device 10. If desired, ferrite structures 86 may be omitted for one or more portions of coil structures 44. If desired, ferrite structures 86 may additionally or alternatively include one or more ferrite cores for the windings in coil structures 44 (e.g., the windings in coil structures 44 may be wound around the ferrite core(s)). Ferrite cores in coil structures 44 may help to maximize the wireless charging efficiency for device 10.

Device 10 may include module 88 (sometimes referred to as backside circuitry module 88 or backside control module 88) that is mounted on or adjacent to rear housing wall 12R. Backside circuitry module 88 may include sensor circuitry and may therefore sometimes be referred to herein as sensor module 88. Central axis 94 may extend (e.g., orthogonally) through a lateral surface of backside circuitry module 88. Backside circuitry module 88 may be separated from rear housing wall 12R, pressed against rear housing wall 12R, adhered to rear housing wall 12R, etc. Backside circuitry module 88 may overlap protruding portion 72 of rear housing wall 12R and may be partially or completely located within protruding portion 72 (e.g., defined between the portions of rear housing wall 12R between dashed lines in FIG. 4). Backside circuitry module 88 may include a rigid printed circuit board, flexible printed circuit, integrated circuit chip, integrated circuit package, plastic substrate, or other substrates for supporting one or more sensors 92 (e.g., one or more sensors 92 may be mounted to a sensor board or a support structure). Sensors 92 may, for example, include sensors in input-output devices 22 of FIG. 2.

If desired, some sensor electrodes may be formed, within, at, or on rear housing wall 12R (e.g., the sensor electrodes may be at least partially embedded within the dielectric material of rear housing wall 12R). In this example, the sensor electrodes may be coupled to sensor circuitry in backside circuitry module 88 using one or more conductive paths (not shown in FIG. 4 for the sake of clarity). The sensor electrodes may, for example, be electrocardiogram (ECG or EKG) electrodes. Sensor circuitry in backside circuitry module 88 may sense the electrical activity of a user's heart using the sensor electrodes formed within, at, or on rear housing wall 12R while the user wears device 10, for example. In another suitable arrangement, the sensor electrodes may be mounted within backside circuitry module 88.

Backside circuitry module 88 may include ground traces (e.g., ground traces in a printed circuit board for sensor circuitry) that are held at a ground or reference potential. If desired, the ground traces in backside circuitry module 88 may be shorted to conductive housing sidewalls 12W, ground traces 67, or other ground structures in device 10. Printed circuit 91 such as a flexible printed circuit may connect to substrate 66 (using connector 78) and may connect to backside circuitry module 88 (using connector 90). As an example, backside circuitry module 88 may convey sensor signals or other signals to components on substrate 66 (e.g., components 68 such as control circuitry 28 in FIG. 2) via printed circuit 91 and may receive control signals or other signals from the components on substrate 66. If desired, circuitry other than sensor circuitry in backside circuitry module 88 may also convey and receive data signals or other signals to and from the components on substrate 66.

In some applications, it may be desirable to incorporate circuitry for high data rate wireless communication connections or links (e.g., implemented using wireless circuitry 34 in FIG. 2) to device 10, thereby improving the data transfer capabilities of device 10. As an example, these wireless connections, in place of bulky ports or connectors for wired connections, may be useable for conveying debug data, test data, and/or other data. If desired, these wireless communication connections may transmit and/or receive data using high data rates in a bidirectional data link (or unidirectional data link) in the near-field domain (e.g., across a distance of less than five inches, less than four inches, less than three inches, etc., rather than in a far-field domain across a distance of greater than five inches, greater than four inches, etc.). As examples, the wireless connections may transmit and receive data using high data rate data transfer operations at speeds of 1 Kilobit (Kbps) per second or more, 100 Kbps or more, 1 Megabit per second (Mbps) or more, 100 Mbps or more, 500 Mbps or more, 1 Gigabit bit per second or more, etc. to satisfactorily perform wireless data transfer operations (e.g., for conveying debug, test, and/or other data).

Given the limited device interior space, incorporating additional wireless circuitry (e.g., antennas) to implement these wireless connections for data transfer may require compact and well-integrated antenna elements. Still referring to FIG. 4, device 10 may include antennas 40-2 or 40-3 used to implement the additional wireless circuitry for high data rate, bidirectional, and/or near-field wireless connections for data transfer. In the illustrative examples described herein, device 10 may include either antenna 40-2 or antenna 40-3. This is merely illustrative. If desired, device 10 may include both antennas 40-2 and 40-3 as illustrated in FIG. 4.

As shown in FIG. 4, antenna 40-2, related components for antenna 40-2, and/or other antenna elements may be formed from and/or integrated with components within backside circuitry module 88. By integrating antenna elements for antenna 40-2 within backside circuitry module 88, device 10 may implement additional wireless connections in a compact and well-integrated manner. In some configurations, the additional wireless circuitry within backside circuitry module 88 may be configured to transmit and receive debug data, test data, and/or other data using high data rate, bidirectional, and/or near-field wireless communication links.

As an example, antenna 40-2 may include one or more sets of antenna structures (sometimes referred to herein as antenna elements) formed from metal layers embedded within a substrate in backside circuitry module 88. The substrate may be a printed circuit or a logic board for device 10 such as a sensor logic board. The substrate may have components such as transceiver circuitry, integrated circuit packages, and other components, which are mounted to a top surface of the substrate that opposes a bottom surface of the substrate at which the one or more separate antenna structures (e.g., antenna resonating elements) formed.

As another example, antenna 40-2 may include one or more sets of antenna structures formed from conductive traces on support structures for components within backside circuitry module 88. The support structures may support sensor components such as sensors 92 and/or other sensor circuitry within backside circuitry module 88, may support a printed circuit or logic board within backside circuitry module 88, may support other components within backside circuitry module 88, and/or may mounted components within backside circuitry module 88 to rear housing wall 12R.

These antenna structures for antenna 40-2 (e.g., antenna structures embedded within a substrate in backside module 88 and/or formed on support structures in backside circuitry module 88) may include antenna resonating elements, parasitic antenna elements, antenna ground structures, antenna feed terminals, antenna short circuit paths, radio-frequency transmission line structures, antenna tuning components, and/or any other suitable antenna elements. In particular, the antenna resonating elements for antenna 40-2 may include patch antenna resonating elements, inverted-F antenna resonating elements, planar inverted-F antenna resonating elements, monopole resonating elements, dipole resonating elements, loop resonating elements, another type of antenna resonating element, and/or a combination of these types of antenna resonating elements.

In the example of FIG. 4, two separate antenna structures (e.g., two separate antenna resonating elements embedded within a substrate in backside module 88 or formed on support structures in backside circuitry module 88) for antenna 40-2 may be formed on opposing lateral sides of backside circuitry module 88 such as at locations 101-1 and 101-2. Antenna structures formed at location 101-1 may transmit and receive radio-frequency signals through an antenna aperture or opening (at least partly defined by coil structures 44 and a portion of backside circuitry module 88) and through rear housing wall 12R as indicated by arrow 102-1. Antenna structures formed at location 101-2 may transmit and receive radio-frequency signals through an additional antenna aperture or opening (at least partly defined by coil structures 44 and a portion of backside circuitry module 88) and through rear housing wall 12R as indicated by arrow 102-2.

If desired, additional antenna structures (e.g., one, two, three, four, five, six, more than six, etc., separate antenna resonating elements in addition to antenna structures at locations 103-1 and 103-2) for antenna 40-2 may be formed within backside circuitry module 88. In the example of backside circuitry module 88 having peripheral edges extending circumferentially around central axis 94, the additional separate antenna structures (and the antenna structures at locations 101-1 and 101-2) for antenna 40-2 may be formed in pairs at opposing peripheral (e.g., lateral) edges of backside circuitry module 88. If desired, the antenna structures for antenna 40-2 may be formed at any suitable location within backside circuitry module 88.

The configuration of antenna structures for wireless circuitry in device 10 operable to perform high data rate data transfer operations through rear housing wall 12R as described in connection with antenna 40-2 is merely illustrative. If desired, wireless circuitry associated device 10 may be implemented outside of backside circuitry module 88. In the example of FIG. 4, device 10 may include antenna 40-3 (instead of antenna 40-2, or if desired, in addition to antenna 40-2). Antenna structures (sometimes referred to herein as antenna elements) for antenna 40-3 may be formed at substrate 66 (e.g., from conductive traces on a bottom surface of substrate 66 that opposes a top surface of substrate 66 at which components 68 are mounted, from metal layers embedded within substrate 66, from conductive traces on structures that extends from substrate 66, etc.).

These antenna structures for antenna 40-3 (e.g., formed at substrate 66) may include antenna resonating elements, parasitic antenna elements, antenna ground structures, antenna feed terminals, antenna short circuit paths, radio-frequency transmission line structures, antenna tuning components, and/or any other suitable antenna elements. In particular, the antenna resonating elements for antenna 40-3 may include patch antenna resonating elements, inverted-F antenna resonating elements, planar inverted-F antenna resonating elements, monopole resonating elements, dipole resonating elements, loop resonating elements, another type of antenna resonating element, and/or a combination of these types of antenna resonating elements.

In the example of FIG. 4, two separate antenna structures (e.g., two separate antenna resonating elements) for antenna 40-3 may be formed on opposing lateral sides of substrate 66 such as at location 103-1 and 103-2. Antenna structures formed at location 103-1 may transmit and receive radio-frequency signals through an antenna aperture or opening (at least partly defined by housing sidewall 12W, antenna resonating element 82, and substrate 84) and through rear housing wall 12R as indicated by arrow 104-1. Antenna structures formed at location 103-2 may transmit and receive radio-frequency signals through an additional antenna aperture or opening (at least partly defined by housing sidewall 12W, antenna resonating element 82, and substrate 84) and through rear housing wall 12R as indicated by arrow 104-2.

If desired, additional antenna structures (e.g., one, two, three, four, five, six, more than six, etc., separate antenna resonating elements in addition to antenna structures at locations 103-1 and 103-2) for antenna 40-3 may be formed at substrate 66. In some configurations, substrate 66 may have peripheral edges that oppose sidewalls 12W and that surround central axis 94. In these configurations, the additional separate antenna structures (and the antenna structures at locations 103-1 and 103-2) for antenna 40-3 may be formed in pairs at or near opposing peripheral edges of substrate 66 (e.g., on the same bottom surface of substrate 66 on opposing sides of substrate 66).

Radio-frequency transceiver circuitry for antenna 40-2 and/or radio-frequency transceiver circuitry for antenna 40-3 may be formed as one or more of the components 68 such as an integrated circuit package on substrate 66, formed as one or more components in backside circuitry module 88, and/or formed at any suitable location in device 10. Respective radio-frequency transceiver circuitries for antennas 40-2 and 40-3 may be coupled to corresponding antenna feeds for antennas 40-2 and 40-3 via radio-frequency transmission lines. The radio-frequency transmission line may convey radio-frequency signals between the respective radio-frequency transceiver circuitry and the corresponding antenna structures.

The radio-frequency transceiver circuitries for antennas 40-2 and 40-3 may include any desired type of transceiver circuitry such as GPS receiver circuitry, WLAN/WPAN transceiver circuitry, cellular telephone transceiver circuitry, near-field communications transceiver circuitry, centimeter and millimeter wave transceiver circuitry, etc. As an example, the radio-frequency transceiver circuitries for antennas 40-2 and 40-3 may implement near-field communications transceiver circuitry 38 (FIG. 2) operable at about 60 GHz (or at any other millimeter/centimeter wave frequency or other suitable frequencies) or may implement any other types of centimeter and millimeter wave transceiver circuitry. The radio-frequency transceiver circuitries may use corresponding antenna structures for antennas 40-2 and 40-3 to transmit and receive debug data, test data, and/or other data based on a high data rate, bidirectional, and/or near-field wireless link for two-way data transfer operations.

If desired, the radio-frequency transceiver circuitries respectively coupled to antennas 40-2 and 40-3 may implement a half-duplex system by using pairs of antenna structures in the corresponding antenna to simultaneously receive or simultaneously transmit radio-frequency antenna signals. As an example, the half-duplex system may use both of antenna structures at locations 101-1 and 101-2 to simultaneously receive large amounts of data (e.g., software, firmware, test data, debug data, etc.), and may thereafter use both of antenna structures at locations 101-1 and 101-2 to transmit large amounts of data (e.g., acknowledgement data, test data such as test results, etc.). If desired, the radio-frequency transceiver circuitries respectively coupled to antennas 40-2 and 40-3 may implement a full-duplex system by using one of a pair of antenna structures in the corresponding antenna to continually serve a transmit function and by using the other one of the pair of antenna structures in the corresponding antenna to continually serve a receive function. As an example, the full-duplex system may use antenna structure at location 103-1 to receive data such as software, firmware, test data, debug data from a transmitting device and simultaneously interact with the transmitting device by using antenna structures at location 103-2 to transmit data (e.g., test results, response or acknowledgement data) back to the transmitting device.

These examples are merely illustrative. If desired, antenna structures at locations 101-1 and 101-2 may be used in a full-duplex system. If desired, antennas structures at locations 103-1 and 103-2 may be used in a half-duplex system.

These configurations of the additional wireless circuitry in device 10 (e.g., antennas 40-2 and 40-3) are merely illustrative. If desired, wireless circuitry for near-field data transfer (through rear housing wall 12R) may be implemented in any suitable region of device 10 (e.g., at components of device 10 besides substrate 66 and backside control module 88, at components near and/or overlapping the rear housing wall 12R, etc.). If desired, the wireless circuitry for near-field data transfer may include one or more antenna resonating elements instead of the antenna resonating elements for antennas 40-2 and 40-3 in FIG. 4.

Figure 5:
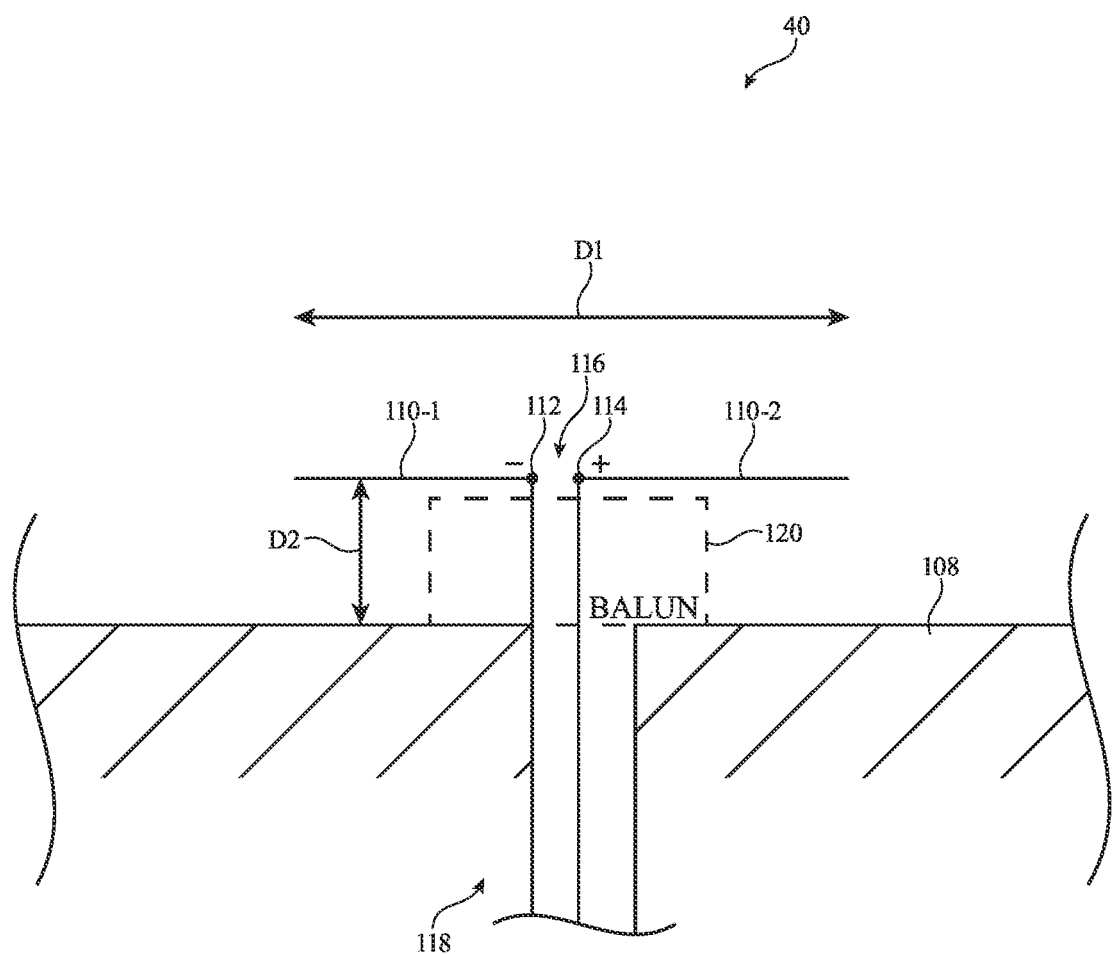
FIG. 5 is a diagram of an illustrative dipole antenna element in accordance with some embodiments.

FIG. 5 is a diagram showing an illustrative dipole antenna resonating element that may be used to implement antenna structures such as antenna elements in antennas 40-2 and/or 40-3 in FIG. 4. As shown in FIG. 5, antenna 40 (referring to one or more of antennas 40-2, 40-3, and/or other antennas in device 10) may be implemented as a dipole antenna. Antenna 40 may include a dipole antenna element (sometimes referred to as a dipole element or a dipole antenna resonating element) having conductive (resonating or radiating) elements (arms) 110-1 and 110-2 that extend along the same axis but in opposite directions from antenna feed 116. Antenna feed 116 may include ground antenna feed terminal 112 coupled to conductive element 110-1 and positive antenna feed terminal 114 coupled to conductive element 110-2.

Radio-frequency transmission line 118 may have a positive signal path coupled to positive antenna feed terminal 114 and a ground signal path coupled to ground antenna feed terminal 112. Balun 120 may be interposed along radio-frequency transmission line 118 and may be interposed between a portion of radio-frequency transmission line 118 and antenna feed 116. If desired, balun 120 may be provided in any suitable configuration within antenna 40 to provide conversion functionalities between balanced and unbalanced signals between the dipole antenna element (e.g., conductive elements 110-1 and 110-2) and radio-frequency transmission line 118.

In general, the frequency response of an antenna is related to the sizes and shapes of the conductive structures in the antenna. Dipole antennas of the type shown in FIG. 4 tend to exhibit response peaks when the length of the dipole antenna element (e.g., the combined length of conductive structures 110-1 and 110-2, e.g., length D1) is equal to the effective wavelength of operation of antenna 40 divided by two. The effective wavelength of operation may be equal to a freespace wavelength multiplied by a constant value that is determined by the dielectric materials around the dipole antenna element.

Conductive elements 110-1 and 110-2 may be backed by an antenna ground or a ground plane such as antenna ground 108, which may serve as an antenna reflector and is sometimes referred to herein as antenna reflector 108. In other words, conductive elements 110-1 and 110-2 may extend above a plane in which antenna reflector 108 is formed. Conductive elements 110-1 and 110-2 may be disposed a distance D2 away from antenna reflector 108. Distance D2 may be equal to the effective wavelength of operation of antenna 40 divided by four or may be any other suitable distance.

In some configurations, the dipole antenna elements for antenna 40 (e.g., conductive elements 110-1 and 110-2, radio-frequency transmission lines 118, antenna reflector 108, balun 120, etc.) may be formed from metal layers (separated by dielectric layers) and vias or other structures embedded in a substrate. As examples, antenna reflector 108 may be formed from connected via structures in a substrate, radio-frequency transmission lines 118 may be formed from stripline structures implemented as metal layers, and conductive elements 110-1 and 110-2 may be formed from metal layers formed on the substrate. If desired, other configurations maybe used to implement the dipole elements for antenna 40. The example of FIG. 5 is merely illustrative. In general, the dipole antenna element may have any desired shape or size, may be formed with or without a reflector structure (e.g., antenna reflector 108), may have additional elements, may be formed using any suitable structures, etc.

As an example, antenna structures at locations 101-1 and 101-2 for antennas 40-2 (similarly antenna structures at locations 103-1 and 103-2 for 40-3) may each be formed from a dipole antenna element of the type shown in FIG. 5. As another example, only some of antenna structures for antennas 40-2 and/or 40-3 may be formed from a dipole antenna element of the type shown in FIG. 5 and the remaining separate sets of the antenna structures may be implemented using any other suitable types of antenna elements. If desired, any other suitable types of antenna resonating elements may be used to implement one or more (or all) of the antenna structures for antennas 40-2 and/or 40-3.

Figure 6:
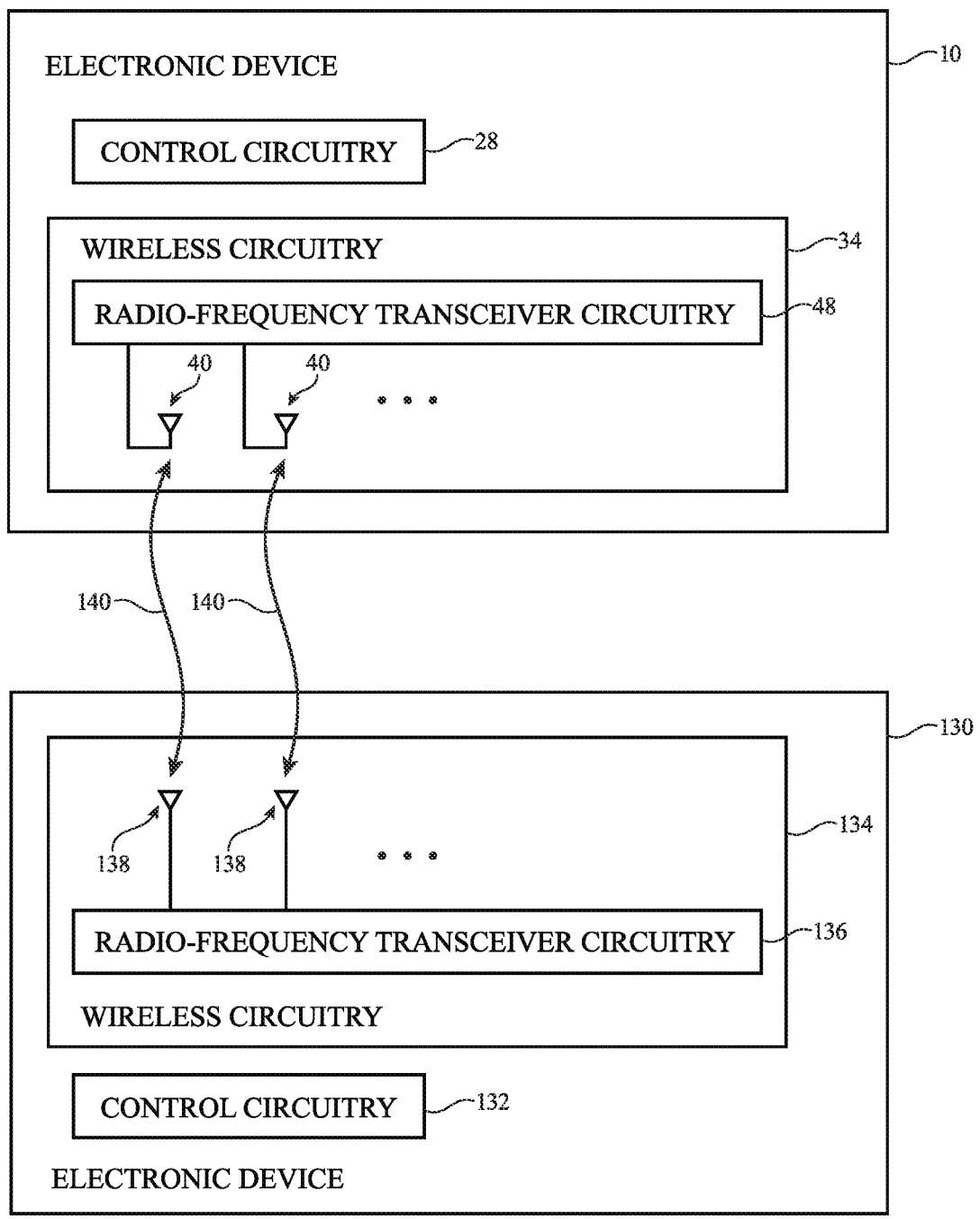
FIG. 6 is a diagram of two illustrative devices that perform high data rate wireless communication operations in accordance with some embodiments.

Electronic device 10 may use antennas 40 (e.g., antennas 40-2 and/or antenna 40-3) to transmit and receive radio-frequency signals to and from another electronic device to perform near-field high data rate data transfer operations through rear housing wall 12R. FIG. 6 is a diagram of a first electronic device such as device 10 and a second electronic device such as device 130 operable to transmit and receive radio-frequency signals to and from each other to perform the high data rate data transfer operations.

Electronic device 130 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an accessory that support the functions of one or more of these devices, a charging device or charging equipment or other types of electronic equipment that interfaces with one or more of these devices, an embedded system such as a system in which electronic equipment with a display is mounted in a kiosk or automobile, equipment that implements the functionality of two or more of these devices, or other electronic equipment.

As an illustrative example, device 130 may be sometimes referred to herein as charging equipment or a charging device such as a wireless power transmitting device, whereas device 10 may be sometimes referred to herein as a wireless power receiving device (e.g., a wristwatch that receives wireless power from charging equipment). Other configurations may be used for devices 10 and 130 if desired. As another illustrative example, device 130 may be a debug or test device (equipment) configured to perform diagnostic operations on device 10, test functions of device 10, perform (software) updates on device 10, etc.

In the example where device 130 is a wireless power transmitting device, device 130 may include one or more coils that are used in transmitting wireless power to device 10. During operation, control circuitry 132 may use wireless power transmitting circuitry in device 130 and one or more coils coupled to the wireless power transmitting circuitry to transmit alternating current electromagnetic signals to device 10 and thereby convey wireless power to wireless power receiving circuitry 42 in device 10 (FIG. 2). The wireless power transmitting circuitry may have switching circuitry (e.g., transistors) that are turned on and off based on control signals provided by control circuitry 132 to create AC current signals through the one or more coils. As the AC currents pass through the coils, alternating-current electromagnetic fields (wireless power signals) are produced that are received by corresponding coil structures 44 coupled to wireless power receiving circuitry 42 in receiving device 10 (FIG. 2). When the alternating-current electromagnetic fields are received by coil structures 44, corresponding alternating-current currents and voltages are induced in coil structures 44. Rectifier circuitry in wireless power receiving circuitry 42 may convert received AC signals (received alternating-current currents and voltages associated with wireless power signals) from coil structures 44 into DC voltage signals for powering device 10. The DC voltages may be used in powering components in device 10 such as a display, touch sensor components and other sensors (e.g., accelerometers, force sensors, temperature sensors, light sensors, pressure sensors, gas sensors, moisture sensors, magnetic sensors, etc.), wireless communications circuitry 34 for communicating wirelessly with other devices or equipment, audio components, and other components, and may be used in charging an internal battery in device 10 such as battery 46 (FIG. 2).

Device 130 may include control circuitry 132 having storage circuitry. The storage circuitry may include hard disk drive storage, nonvolatile memory (e.g., flash memory or other electrically-programmable-read-only memory configured to form a solid-state drive), volatile memory (e.g., static or dynamic random-access-memory), etc. Control circuitry 132 may include processing circuitry. The processing circuitry may be used to control the operation of device 130. The processing circuitry may include on one or more microprocessors, microcontrollers, digital signal processors, host processors, baseband processor integrated circuits, application specific integrated circuits, central processing units (CPUs), etc. Control circuitry 132 may be configured to perform operations in device 130 using hardware (e.g., dedicated hardware or circuitry), firmware, and/or software. Software code for performing operations in device 130 may be stored on storage circuitry in control circuitry 132 (e.g., the storage circuitry may include non-transitory (tangible)

computer readable storage media that stores the software code). The software code stored on the storage circuitry in control circuitry 132 may be executed by the processing circuitry in control circuitry 132.

In the wireless power transmitting device example, control circuitry 132 may be used in determining power transmission levels, processing sensor data, processing user input, processing other information such as information on wireless coupling efficiency from wireless power transmitting circuitry, processing information from wireless power receiving circuitry, processing information to determine when to start and stop wireless charging operations, adjusting charging parameters such as charging frequencies, coil assignments in a multi-coil array, and wireless power transmission levels, and performing other control functions.

To support interactions with external device or equipment, control circuitry 132 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, data transfer protocols, etc. Each communications protocol may be associated with a corresponding radio access technology (RAT) that specifies the physical connection methodology used in implementing the protocol.

Control circuitry 132 may handle data transfer protocols to perform high data rate data transfer operations (e.g., data transfer operations at speeds of 100 Megabits per second (Mbps) or more, at 500 Mbps or more, 1 bit per second or more, etc.). Data transfer protocols that may be implemented by control circuitry 132 may include Universal Serial Bus (USB) protocols, universal asynchronous receiver/transmitter (UART) protocols, Peripheral Component Interconnect (PCI) protocols, Peripheral Component Interconnect Express (PCIe) protocols, Accelerated Graphics Port (AGP) protocols, or any other desired data transfer protocols capable of data speeds (i.e., data rates) of greater than or equal to approximately 100 Mbps.

Electronic device 130 of FIG. 6 may be provided with wireless circuitry 134. Wireless circuitry 134 may be used to support wireless communications in multiple wireless communications bands. Communications bands handled by wireless circuitry 130 can include satellite navigation system communications bands, cellular telephone communications bands, wireless local area network communications bands, wireless personal area network communications bands, near-field communications bands, ultra-wideband communications bands, centimeter wave communications bands, millimeter wave communications bands, or other wireless communications bands.

Wireless circuitry 130 may include one or more antennas 138. Antennas 138 may include loop antennas, inverted-F antennas, strip antennas, planar inverted-F antennas, patch antennas, slot antennas, monopole antennas, dipole antennas, hybrid antennas that include antenna structures of more than one type, or other suitable antennas. If desired, one or more antennas 138 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antennas 138 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Wireless circuitry 134 may include one or more radio-frequency transceiver circuitries 136 (e.g., near-field communications transceiver circuitry, centimeter wave and millimeter wave transceiver circuitry, or other types of transceiver circuitry) each coupled to at least a given antenna 138 using a radio-frequency transmission line path. The radio-frequency transmission line path may include a positive signal conductor and a ground signal conductor. A matching network may include components such as inductors, resistors, and capacitors used in matching the impedance of antenna 138 to the impedance of the radio-frequency transmission line path. The radio-frequency transmission line path may be coupled to antenna feed structures associated with one or more antennas 138. A positive antenna feed terminal may be coupled to an antenna resonating (radiating) element within a given antenna 138. A ground antenna feed terminal may be coupled to an antenna ground in a given antenna 138. The signal conductor may be coupled to the positive antenna feed terminal and the ground conductor may be coupled to the ground antenna feed terminal.

In some configurations that are sometimes described herein as an example, radio-frequency transceiver circuitry 136 may include near-field communications circuitry operable at frequencies above about 10 GHz (e.g., at frequencies between about 10 GHz and 300 GHz), and is sometimes referred to herein as millimeter/centimeter wave transceiver circuitry. The millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz. As an example, the near-field communications circuitry may include millimeter/centimeter wave transceiver circuitry operable at about 60 GHz (or any frequency in a millimeter/centimeter wave frequency band) to establish a wireless link useable for data transfer operations (e.g., with device 10 as a wristwatch or as another type of electronic device or equipment). If desired, the near-field communications circuitry may include radio-frequency transceiver circuitry operable at a frequency lower than 10 GHz to establish a wireless link usable for data transfer. In some configurations, non-near-field communications circuitry may be used to support communications in Extremely High Frequency (EHF) or millimeter wave communications bands between about 30 GHz and 300 GHz and/or in centimeter wave communications bands between about 10 GHz and 30 GHz. Wireless data transfer protocols may be used by transceiver circuitry 136 to bidirectionally transfer data at these frequencies.

If desired, wireless circuitry 134 in device 130 may transmit and/or receive data using high data rates in a bidirectional data link (or unidirectional data link) and in the near-field domain (e.g., across a distance of less than five inches, less than four inches, less than three inches, etc., rather than in a far-field domain across a distance of greater than five inches, greater than four inches, etc.) to and/or from wireless circuitry 34 in device 10 (via signals 140). As examples, the wireless connections may transmit and receive data using high data rate data transfer operations at speeds of 1 Kilobit (Kbps) per second or more, 100 Kbps or more, 1 Megabit per second (Mbps) or more, 100 Mbps or more, 500 Mbps or more, 1 Gigabit bit per second or more, etc. to satisfactorily perform wireless data transfer operations (e.g., for conveying debug, test, and/or other data).

Communications between the respective wireless circuitries for devices 10 and 130 at relatively high frequencies, such as at frequencies of about 10-300 GHz, and in the near-field domain (while being helpful in effectively facilitating high data rate data transfer operations) can face significant challenges if care is not taken. As an example, signal polarization misalignment between signals from respective wireless circuitries for devices 10 and 130 and directional misalignment between the respective wireless circuitries for devices 10 and 130 can often degrade wireless communication links at these relatively high frequencies and in the near-field domain. It is therefore desirable to provide mechanisms through which devices 10 and 130 (e.g., respective wireless circuitries in devices 10 and 130) may be more robustly and reliably aligned with respect to each other to satisfactorily establish and maintain these wireless communication links.

Figure 7:
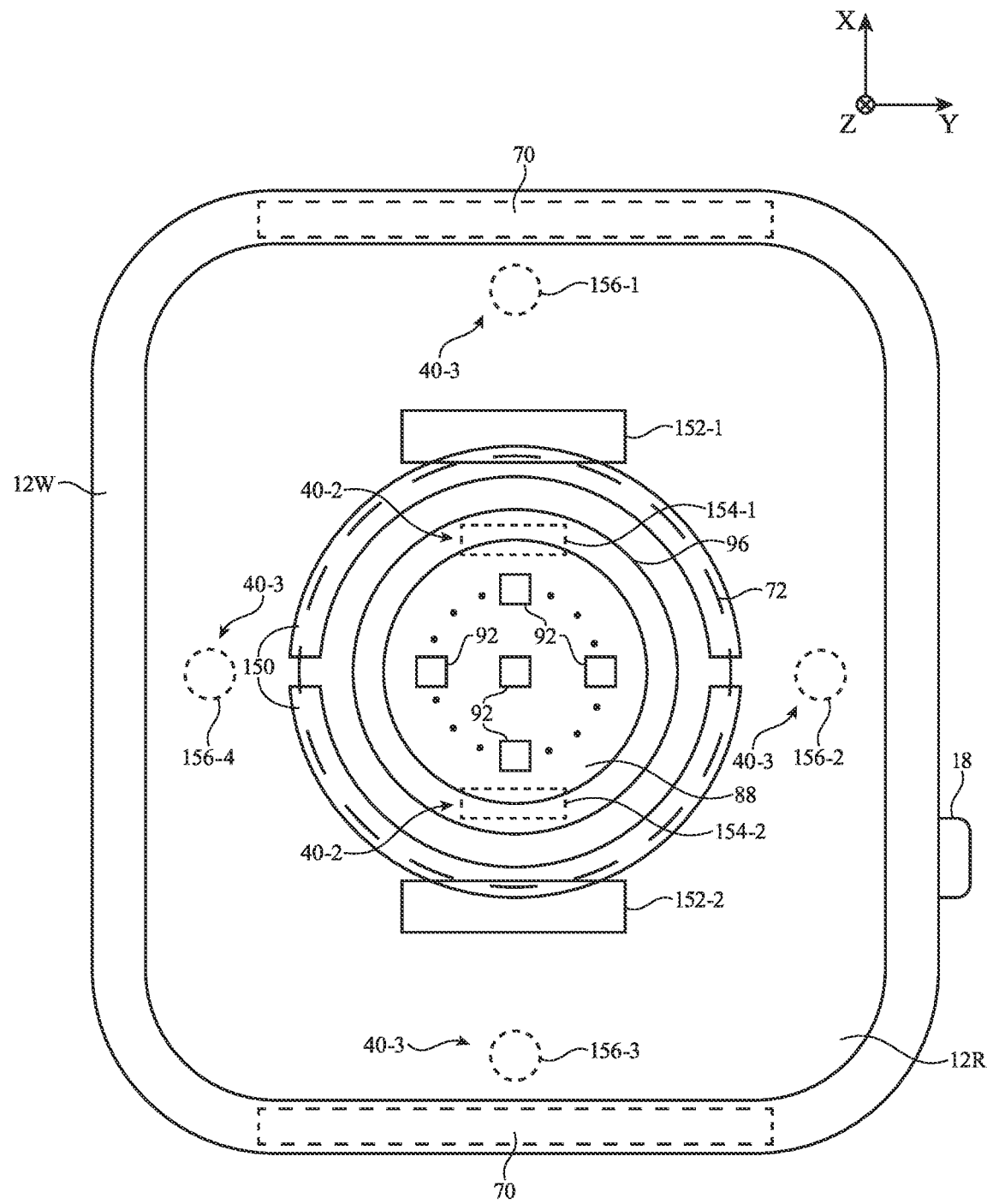
FIG. 7 is a bottom-up view of a first electronic device having antenna elements and attachment structures that overlap a rear housing wall in accordance with some embodiments.
Figure 8:
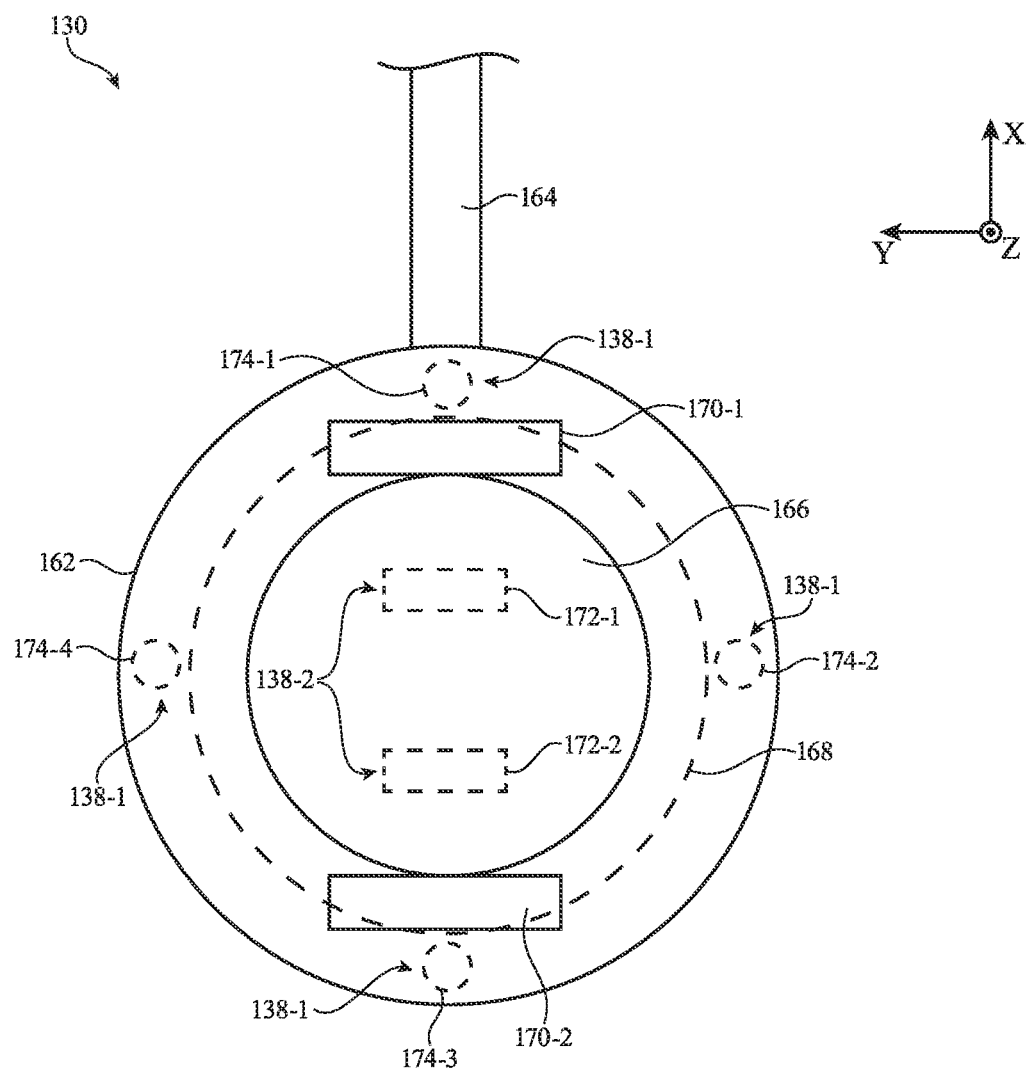
FIG. 8 is a top-down view of a second electronic device having antenna elements and attachment structures that are configured to align with antenna elements and attachment structures in a first electronic device such as the first electronic device of FIG. 7 in accordance with some embodiments.

FIGS. 7 and 8 show how a first device such as device 10 and a second device such as device 130 may be configured to align and attach to each other in a robust manner to satisfactorily establish and maintain these wireless communication links. FIG. 7 is a bottom-up view of an illustrative electronic device such as device 10 (in FIG. 6) having alignment or attachment structures configured to align device 10 with and attach device 10 to other devices such as device 130 (in FIG. 6). As shown in FIG. 7, rear housing wall 12R may define a rear face of device 10. Rear housing wall 12R may have a circular protruding portion within dashed circle 72. In other words, the portion of rear housing wall 12R outside of dashed circle 72 may lie substantially on a flat plane (e.g., the plane of the page, the X-Y plane), and the portion of rear housing wall 12R inside of dashed circle 72 may protrude from the plane in the −Z direction (e.g., out of the page in FIG. 7).

Components in device 10 such as backside circuitry module 88 and one or more coils 96 may overlap the protruding portion in rear housing wall 12R. Sensor electrodes 150 may also be formed at a protruding portion of rear housing wall 12R. In particular, sensor electrodes 150 may have two portions that laterally surround backside circuitry module 88 and one or more coils 96. Additionally, one or more coils 96 may surround backside circuitry module 88.

In some examples (e.g., configurations without antenna 40-3), device 10 may include antenna 40-2 with antenna resonating elements 154-1 and 154-2 (e.g., antenna structures formed at locations 101-1 and 101-2 in FIG. 4). Antenna resonating elements 154-1 and 154-2 may be formed on opposing sides of backside circuitry module 88 and may be integrated within components of backside circuitry module 88. In particular, antenna resonating element 154-1 may be interposed between a portion of coil(s) 96 and a portion of backside circuitry module 88. Antenna resonating element 154-2 may be interposed between a different portion of coil(s) 96 and a different portion of backside circuitry module 88. As shown in FIG. 7, antenna resonating elements 154-1 and 154-2 may be formed on top and bottom sides of backside circuitry module 88 parallel to the top and bottom sidewalls 12W in which attachment structures 70 are formed. In other words, antenna resonating element 154-1 may be interposed between the top sidewall 12W and a portion of backside circuitry module 88, and antenna resonating element 154-1 may be interposed between the bottom sidewall 12W and a portion of backside circuitry module 88. This is merely illustrative. If desired, antenna resonating elements 154-1 and 154-2 may be formed at any suitable location in device 10 (e.g., on left and right sides of backside circuitry module 88). If desired, additional resonating elements (additional to antenna resonating elements 154-1 and 154-2) may be form at any suitable location in device 10.

In some examples (e.g., configurations without antenna 40-2), device 10 may include antenna 40-3 with antenna resonating elements 156-1 and 156-3 (e.g., antenna structures formed at locations 130-1 and 130-2 in FIG. 4) and optionally antenna resonating elements 156-2 and 156-4 instead of or in addition to antenna resonating elements 156-1 and 156-3. Antenna resonating elements 156-1, 156-2, 156-3, and 156-4 may be disposed along the four sides of rear housing wall 12R and outside the protruding portion of rear housing wall 12R. Antenna resonating elements 156-1, 156-2, 156-3, and 156-4 may be formed at substrate 66 (FIG. 3) and may be aligned with openings in antenna resonating element 82 (not shown in FIG. 4 for clarity), which may overlap a substantial part of the portion of rear housing wall 12R outside of dashed circle 12R.

These examples are merely illustrative. If desired, any of antenna resonating elements 156 may be omitted from antenna 40-3 and any of antenna resonating elements 154 may be omitted from antenna 40-2. If desired, any other antenna elements at any suitable locations may be incorporated into device 10 as part of antennas 40-2 or 40-3.

To ensure that antennas 40-2 and/or 40-3 may effectively transmit and receive signals to and from other devices or equipment, device 10 may include alignment structures 152-1 and 152-2 (sometimes referred to herein as attachment structures). Alignment structures 152-1 and 152-2 may include magnetic structures or magnets that overlap rear housing wall 12R. If desired, alignment structures 152-1 and 152-2 may be formed from non-magnetic structures such as posts, pins, clips, springs, brackets, holes, etc., or any other suitable alignment structures.

In some exemplary configurations, alignment structures 152-1 and 152-2 may be incorporated into rear housing wall 12R, may be mounted directly to rear housing wall 12R, may be adhered to rear housing wall 12R, or may be formed at any suitable location overlapping rear housing wall 12R. Alignment structures 152-1 and 152-2 may bias rear housing wall and thus device 10 against other alignment structures in other devices or equipment (e.g., device 130 in FIG. 6 with which device 10 may wireless communicate). In other words, the alignment structures 152-1 and 152-2 may lock or fix the relative position of device 10 in one or more of the X, Y, and Z directions with respect to another device or equipment (via a magnetic force or any other suitable force).

In the example of FIG. 7, alignment structure 152-1 may be interposed between the top sidewall 12W and the top portion of electrode 150, and alignment structure 152-2 may be interposed between the bottom sidewall 12W and the bottom portion of electrode 150. If desired, some or all of the antenna elements of antennas 40-2 or 40-3 (e.g., antenna elements 156-1 and 156-3, or antenna elements 154-1 and 154-2) may be formed along the same axis (e.g., the X-axis) as alignment structures 152. If desired, some or all of the antenna elements of antennas 40-2 or 40-3 (e.g., antenna elements 156-2 and 156-4) may be formed along an axis (e.g., the Y-axis) that is perpendicular to the axis (e.g., the X-axis) along which alignment structures 152 lie.

As examples, attachment structures 152-1 and/or 152-2 may overlap only a planar portion of rear housing wall 12R outside of dashed circle 72, may overlap only a protruding portion of rear housing wall 12R inside of dashed circle 72, or may overlap both the planar portion and the protruding portion of rear housing wall 12R. In the example of FIG. 7, attachment structures 152-1 and 152-2 have a rectangular shape or outline. However, these examples are merely illustrative. If desired, these attachment structures in device 10 may have a suitable shape or outline, may be located any suitable location, may include any number of separate structures, etc.

FIG. 8 is a top-down view of an illustrative electronic device such as device 130 (FIG. 6) having alignment or attachment structures configured to align device 130 with and attach device 130 to other devices such as device 10 (FIG. 7). In the example of FIG. 8, device 130 may be equipment that is coupled to power adapter circuitry using a cable such as cable 164, through which device 130 receives power. If desired, device 130 may be a stand-alone charger. Power transmitting device 130 may include power transmitting circuitry for transmitting wireless power to a wireless power receiving device such as device 10.

Device 130 may have a housing with a cylindrical shape and may therefore have a circular top-down outline. If desired, device 130 may have any other suitable shape. The top surface or the housing at the top surface of device 130 (sometime referred to herein as the top surface housing or housing portion of device 130) may have a depressed or recessed portion within dashed circle 168 and may have a planar portion outside dashed circle 168. In other words, the top surface housing portion of device 130 outside of dashed circle 168 may lie substantially in a flat plane (e.g., the plane of the page in FIG. 8, the X-Y plane) and the top surface housing portion of device 130 inside of dashed circle 168 may be recessed from the plane in the −Z direction (e.g., into the page in FIG. 7). As an example, the recessed portion of device 130 may accommodate for the protruding portion of rear housing wall 12R in device 10 (FIG. 7) such that when the rear housing wall of device 10 is placed onto the top surface housing of device 130, device 10 may be placed in a relatively flush manner on device 130.

Device 130 may include one or more coils such as coil structures 166 that overlap the recessed top surface portion of the housing. Coil structures 166 in device 130 may align with coil structures 44 in device 10 (e.g., coils 96 in device 10 of FIG. 7). Device 130 may include power transmitting circuitry, control circuitry, and other components operable to perform wireless power transmission functions using coil structures 166. In the example of FIG. 8, coil structures 166 may overlap a central location of the top surface housing. This is merely illustrative. If desired, coil structures 166 may be formed at any suitable location.

Additionally, device 130 may include wireless circuitry 134 (FIG. 6) having antennas 138-1 and/or 138-2. In the illustrative examples described herein, device 130 may include either antenna 138-1 or antenna 138-2. This is merely illustrative. If desired, device 130 may include both antennas 138-1 and 138-2 as illustrated in FIG. 8.

Antenna 138-1 may include separate antenna structures such as antenna resonating elements 174-1, 174-2, 174-3, and 174-4 (sometimes referred to herein as antenna elements) that are disposed along the peripheral sides of device 130 outside of the recessed top surface portion of the housing. Antenna 138-2 may include separate antenna structures such as antenna resonating elements 172-1 and 172-2 (sometimes referred to herein as antenna elements) that overlap the recessed top surface housing portion. As examples, antenna elements for antenna 138-1 in device 130 may be operable to transmit and receive radio-frequency signals to and from antenna 40-3 in device 10, and antenna elements for antenna 138-2 in device 130 may be operable to transmit and receive radio-frequency signals to and from antenna 40-2 in device 10.

Respective radio-frequency transceiver circuitries 136 in wireless circuitry 134 (FIG. 6) may be coupled to antennas 138-1 and 138-2. Radio-frequency transceiver circuitries 136 may be coupled to antennas 138-1 and 138-1 in the analogous manner as described for wireless circuitry 34 in connection with FIG. 3. These descriptions are omitted in order to not unnecessarily obscure the embodiments of FIG. 8.

Furthermore, antenna resonating elements for antenna 138-1 and/or antenna 138-2 may be formed from dipole antenna element such as the dipole antenna element shown in FIG. 5. This is merely illustrative. If desired, antenna resonating elements for antennas 138-1 and/or 138-2 may be formed from patch antenna resonating elements, inverted-F antenna resonating elements, planar inverted-F antenna resonating elements, monopole resonating elements, dipole resonating elements, loop resonating elements, another type of antenna resonating element, and/or a combination of these types of antenna resonating elements.

To ensure antennas 138-1 and/or 138-2 may effectively transmit and receive signals to and from a communicating device, alignment structures 170-1 and 170-2 (sometimes referred to herein as attachment structures) such as magnetic structures or magnets may overlap the top surface housing of device 130. If desired, alignment structures 170-1 and 170-2 may be formed from non-magnetic structures or any other suitable alignment structures.

In some exemplary configurations, structures 170-1 and 170-2 may incorporated into the top housing wall of device 130, may be mounted directly to the top housing wall of device 130, may be adhered to rear housing wall 12R, may be formed at any suitable location overlapping the top housing wall of device 130. Alignment structures 170-1 and 170-2 may bias the top housing wall and hence device 130 against other alignment structures in devices or equipment (e.g., device 10 in FIG. 7 with which device 130 may wireless communicate). In other words, the alignment structures 170-1 and 170-2 may lock or fix the relative position of device 130 in the X, Y, and Z directions with respective to another device or equipment (via a magnetic force or any other suitable force).

In the example of FIG. 8, alignment structure 170-1 may be interposed between an upper edge portion of device 130 and coil structures 166, and alignment structure 170-2 may be interposed between a lower edge portion and coil structures 166. If desired, some or all of the antenna elements of antennas 138-1 or 138-2 (e.g., antenna elements 172-1 and 172-2, or antenna elements 174-1 and 174-3) may be formed along the same axis (e.g., the X-axis) as alignment structures 170. If desired, some or all of the antenna elements of antennas 138-1 or 138-2 (e.g., antenna elements 174-2 and 174-4) may be formed along an axis (e.g., the Y-axis) that is perpendicular to the axis (e.g., the X-axis) along which alignment structures 170 lie.

As examples, attachment structures 170-1 and/or 170-2 may overlap only a planar portion of the top surface housing outside of dashed circle 168, may overlap only a recessed portion of the top surface housing inside of dashed circle 168, or may overlap both the planar portion and the recessed portion of the top surface housing of device 130. In the example of FIG. 8, attachment structures 170-1 and 170-2 may have a rectangular shape or outline. However, these examples are merely illustrative. If desired, these attachment structures in device 130 may have a suitable shape or outline, may be located any suitable location, may include any number of separate structures, etc.

Referring to both FIGS. 7 and 8 when device 10 is placed on top of device 130 such that the rear surface of device 10 is adjacent to (overlapping) the top surface of device 130, regardless of the rotational orientation about the Z-axis, magnetic structures 152-1 and 152-2 in device 10 and magnetic structures 170-1 and 170-2 in device 10 may forcibly align the rotational orientation of device 10 to device 130 and attach device 10 to device 130. In particular, magnetic forces or non-magnetic forces may rotate device 10 clockwise or counterclockwise about the Z-axis such that magnetic structures 152-1 and 170-1 are aligned (e.g., overlap in the Z-direction) and magnetic structures 152-2 and 170-2 are aligned (e.g., overlap in the Z-direction) or such that magnetic structures 152-1 and 170-2 are aligned (e.g., overlap in the Z-direction) and magnetic structures 152-2 and 170-1 are aligned (e.g., overlap in the Z-direction). In either of these two alignment states antennas 40-2 and 138-2 (e.g., antenna resonating elements in antennas 40-2 and 138-2) may be satisfactorily aligned (e.g., have satisfactory signal polarization alignment, have satisfactory directional alignment, etc.) to perform reliable wireless communications such as near-field high data rate data transfer operations and/or antennas 40-3 and 138-1 (e.g., antenna resonating elements in antennas 40-2 and 138-2) may be satisfactorily aligned to perform reliable wireless communications such as near-field high data rate data transfer operations.

The configurations of device 10 in FIG. 7 and device 130 in FIG. 8 are merely illustrative. If desired one or more antenna resonating elements may be omitted from one or both of devices 10 and 130. If desired, devices 10 and 130 may have different numbers of antenna resonating elements operable to perform high data rate data transfer operations. As an example, device 10 may have only two separate antenna resonating elements operable to perform data transfer operations with device 130, while device 130 may have four separate antenna resonating elements, of which two are active and two are inactive when devices 10 and 130 are satisfactorily aligned using attachment structures.

If desired, devices 10 and 130 may have other corresponding alignment structures in addition to or instead of magnetic structures 152-1, 152-2, 170-1, and 170-2. If desired, a single continuous attachment structure may be disposed within each of devices 10 and 130 for alignment (instead of two separate magnetic structures as shown in FIGS. 7 and 8). If desired, more than two separate attachment structures may be disposed within each of devices 10 and 130 for alignment. In some configurations, (magnetic) alignment or attachment structures such as structures 152-1, 152-2, 170-1, and 170-2 may be omitted from devices 10 and 130. In some configurations and in the absence of these alignment or attachment structures, devices 10 and 130 may still be operable to achieve satisfactory alignment for wireless communications (e.g., for high data rate data transfer operations).

Figure 9:
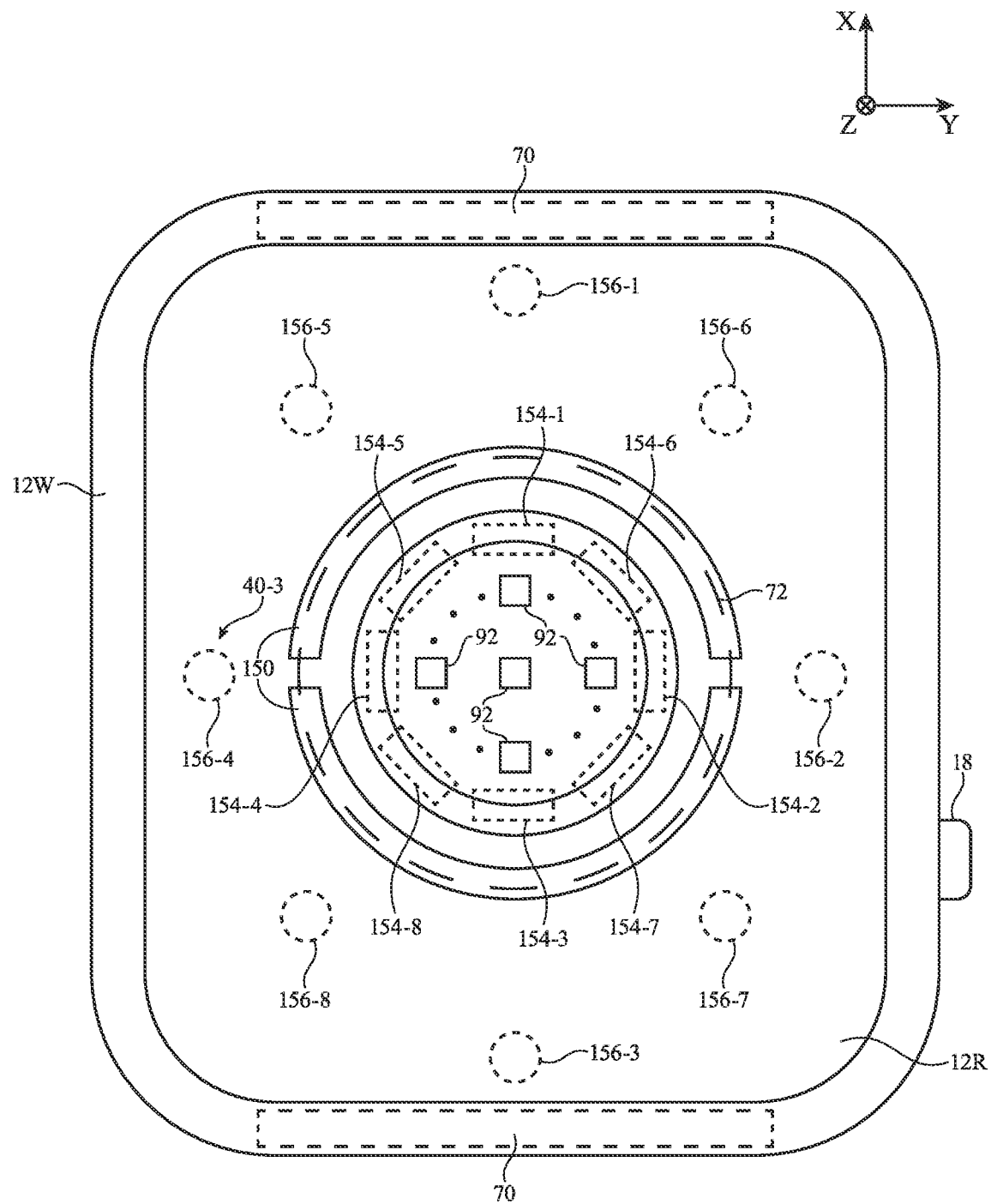
FIG. 9 is a bottom-up view of a first electronic device having an array of antenna elements that overlap a rear housing wall in accordance with some embodiments.
Figure 10:
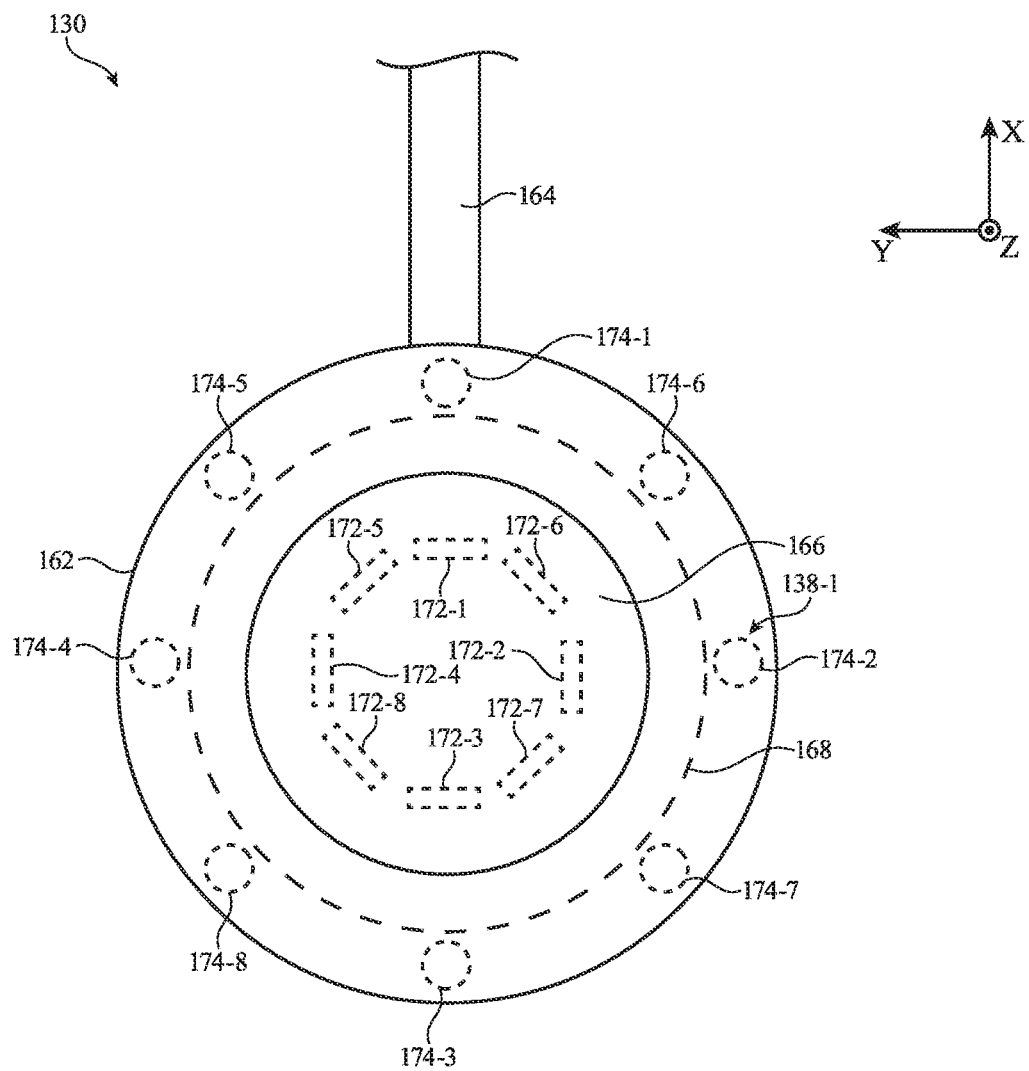
FIG. 10 is a top-down view of a second electronic device having an array of antenna elements that are configured to align with an array of antenna elements in a first electronic device such as the first electronic device shown in FIG. 9 in accordance with some embodiments.

FIGS. 9 and 10 show how a first device such as device 10 and a second device such as device 130 may be configured to satisfactorily establish and maintain wireless communication links for high data rate data transfer operations without dedicated alignment or attachment structures. FIG. 9 is a bottom-up view of an illustrative electronic device such as device 10 (in FIG. 6) having one or more arrays of antenna elements operable to wirelessly communicate with other devices such as device 130 (in FIG. 6).

As a first example, device 10 may include an antenna array (e.g., antenna 40-2 or sometimes referred to herein as antenna array 40-2) formed from antenna resonating elements 154-1, 154-2, 154-3, 154-4, 154-5, 154-6, 154-7, and 154-8 (sometimes referred to collectively as antenna resonating elements 154). Antenna resonating elements 154 may be formed in a circumferential pattern surrounding a central axis of device 10 (e.g., central axis 94 in FIG. 4), may be disposed along a circumferential path from the central axis of device 10, may be disposed equidistantly from the central axis of device 10, etc. In particular, antenna resonating elements 154 may be formed around the peripheral edges of backside circuitry module 88. If desired, antenna resonating elements 154 may overlap the protruding portion of the rear wall housing, may be laterally surrounded by coil(s) 96 (shown in FIG. 7, omitted from FIG. 9 for clarity) and sensor electrodes 150, and may laterally surround portions of backside circuitry module 88 (e.g., sensors 92).

Antenna resonating elements 154 may be coupled to the same radio-frequency transceiver circuitry 48 (FIG. 6) such as near-field communications circuitry and/or centimeter wave and millimeter wave transceiver circuitry and may be operable in pairs (e.g., pairs of antenna resonating elements 154-1 with 154-3, 154-2 with 154-4, 154-5 with 154-7, and 154-6 with 154-8). The pairs may implement a half-duplex system or a full duplex system. The two antenna resonating elements in each pair may be disposed on opposing sides of backside circuitry module 88.

As a second example, device 10 may include an antenna array (e.g., antenna 40-3 or sometimes referred to herein as antenna array 40-3) formed from antenna resonating elements 156-1, 156-2, 156-3, 156-4, 156-5, 156-6, 156-7, and 157-8 (sometimes referred to collectively as antenna resonating elements 156). Antenna resonating elements 156 may be formed in a circumferential pattern surrounding a central axis of device 10 (e.g., central axis 94 in FIG. 4), may be disposed along a circumferential path from the central axis of device 10, may be disposed equidistantly from the central axis of device 10, etc. In particular, antenna resonating elements 156 may be formed near or at the peripheral edges of rear housing wall 12R. If desired, antenna resonating elements 154 may overlap the planar portion (e.g., the non-protruding portion of rear housing wall 12R), may be laterally surround electrodes 150, coil(s) 96 (FIG. 7), and backside circuitry module 88.

Antenna resonating elements 156 may be coupled to the same radio-frequency transceiver circuitry 48 (FIG. 6) such as near-field communications circuitry and/or centimeter wave and millimeter wave transceiver circuitry and may be operable in pairs (e.g., pairs of antenna resonating elements 156-1 with 156-3, 156-2 with 156-4, 156-5 with 156-7, and 156-6 with 156-8). The pairs may implement a half-duplex system or a full-duplex system. The two antenna resonating elements in each pair may overlap on opposite sides of rear housing wall 12R.

These examples are merely illustrative. If desired, antenna resonating elements 154 and/or 156 may be formed in any suitable pattern to overlap rear housing wall 12R. If desired, antenna resonating elements 154 and/or 156 may include any suitable number of separate antennas resonating elements that form antenna arrays 40-2 and/or 40-3. If desired, antenna resonating elements 154 and/or 156 may operate singularly or collectively as suitable.

FIG. 10 is a top-down view of an illustrative electronic device such as device 130 (in FIG. 6) having one or more arrays of antenna elements operable to wirelessly communicate with other devices such as device 10 (in FIG. 8).

As a first example (e.g., congruent with the first example for device 10 in FIG. 9), device 130 may include an antenna array (e.g., antenna 138-2 or sometimes referred to herein as antenna array 138-2) formed from antenna resonating elements 172-1, 172-2, 172-3, 172-4, 172-5, 172-6, 172-7, and 172-8 (sometimes referred to collectively as antenna resonating elements 172). Antenna resonating elements 172 may be formed in a circumferential pattern surrounding a central axis of device 130 (e.g., an axis that runs orthogonally from a center point in the circular outline of device 130 in the Z-direction), may be disposed along a circumferential path from the central axis of device 130, may be disposed equidistantly from the central axis of device 130, etc. If desired, antenna resonating elements 172 may overlap the planar portion (e.g., a non-recessed portion) of the top surface housing (e.g., outside of dashed circle 168) and may be laterally surround coil structures 166.

Antenna resonating elements 172 may be coupled to the same radio-frequency transceiver circuitry 136 (FIG. 6) such as near-field communications circuitry and/or centimeter wave and millimeter wave transceiver circuitry and may be operable in pairs (e.g., pairs of antenna resonating elements 172-1 with 172-3, 172-2 with 172-4, 172-5 with 172-7, and 172-6 with 172-8). The pairs may implement a half-duplex system or a full duplex system. The two antenna resonating elements in each pair may overlap opposite sides of the top surface housing of device 130.

As a second example (e.g., congruent with the second example for device 10 in FIG. 9), device 130 may include an antenna array (e.g., antenna 138-1 or sometimes referred to herein as antenna array 138-1) formed from antenna resonating elements 174-1, 174-2, 174-3, 174-4, 174-5, 174-6, 174-7, and 174-8 (sometimes referred to collectively as antenna resonating elements 174). Antenna resonating elements 174 may be formed in a circumferential pattern surrounding a central axis of device 130 (e.g., an axis that runs orthogonally from a center point in the circular outline of device 130), may be disposed along a circumferential path from the central axis of device 130, may be disposed equidistantly from the central axis of device 130, etc. If desired, antenna resonating elements 174 may overlap the recessed portion of top surface housing (e.g., within dashed circle 168, may be laterally surround or be laterally surrounded by coil structures 166.

Antenna resonating elements 174 may be coupled to the same radio-frequency transceiver circuitry 136 (FIG. 6) such as near-field communications circuitry and/or centimeter wave and millimeter wave transceiver circuitry and may be operable in pairs (e.g., pairs of antenna resonating elements 174-1 with 174-3, 174-2 with 174-4, 174-5 with 174-7, and 174-6 with 174-8). The pairs may implement a half-duplex system or a full duplex system. The two antenna resonating elements in each pair may overlap opposite sides of the top surface housing of device 130.

These examples are merely illustrative. If desired, antenna resonating elements 172 and/or 174 may be formed in any suitable pattern to overlap the top surface housing of device 130. If desired, antenna resonating elements 172 and/or 174 may include any suitable number of separate antennas resonating elements that form antenna arrays 138-2 and/or 138-1. If desired, antenna resonating elements 172 and/or 174 may operate singularly or collectively as suitable.

By providing antenna array 40-2 on device 10 and antenna array 138-2 on device 130, regardless of the rotational orientation about the Z-axis of device 10 with respect to device 130, at least one pair of antenna resonating elements from each device may be satisfactorily aligned to perform wireless communication.

Figure 11:
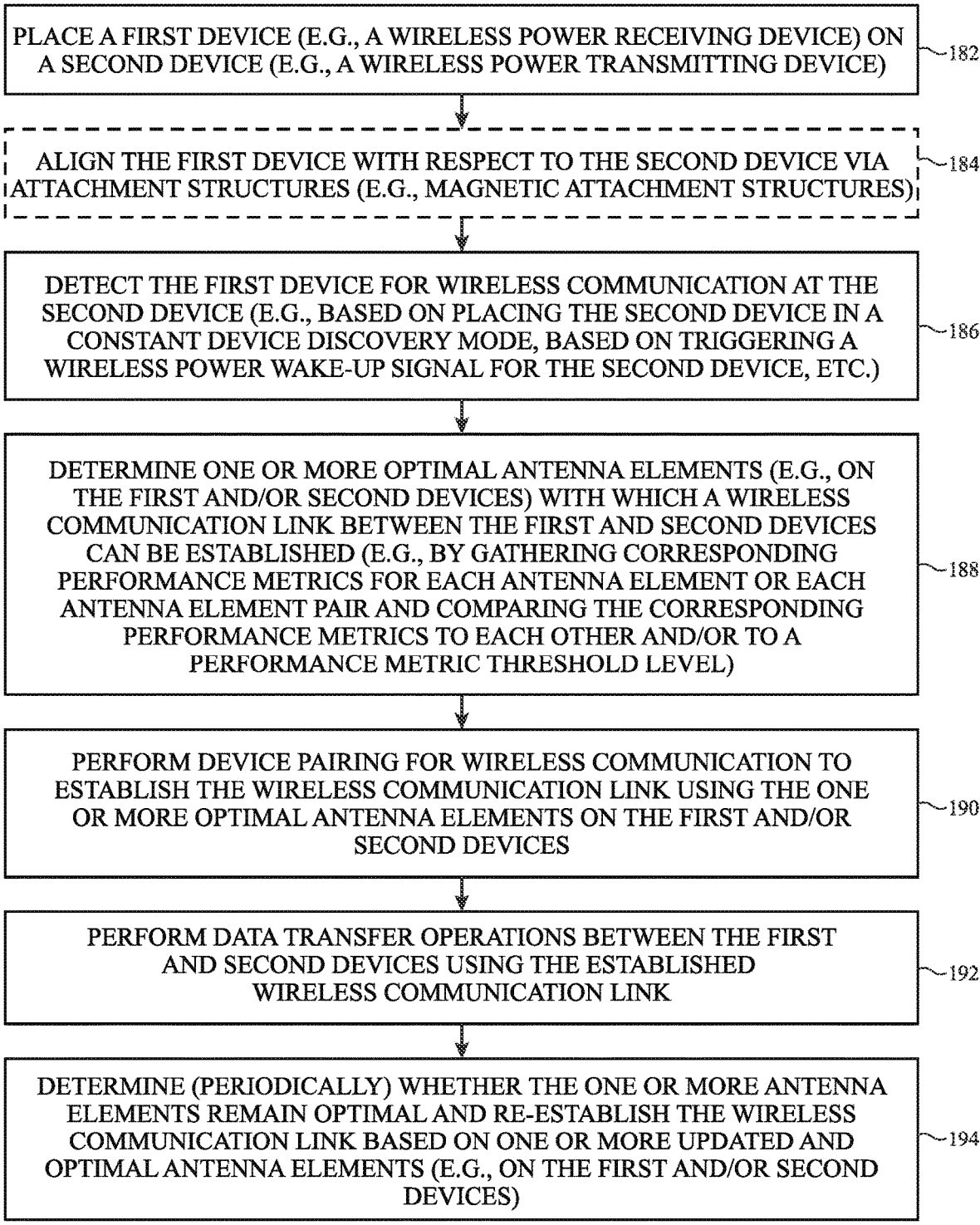
FIG. 11 is an illustrative flowchart for establishing a wireless communication link between first and second electronic devices in accordance with some embodiments.

FIG. 11 is an illustrative flowchart for establishing wireless connections between two devices such as devices 10 and 130. As an example, control circuitry on devices 10 and/or 130 in FIGS. 9 and 10 may process one or more steps in FIG. 11 to establish and maintain wireless connections between each other. At step 182, a first device (e.g., a wireless power receiving device 10) may be placed on a second device (e.g., a wireless power transmitting device 130). As an example, the housing at the top surface of device 130 having a recessed portion may receive rear housing wall 12R (FIG. 9) of device 10 having a protruding portion.

Optionally, at step 184, alignment or attachment structures such as structures 152 and 170 in FIGS. 7 and 8 or other structures may align device 10 with respective to the device 130 via attachment structures such as magnetic attachment structures. In some configurations, this alignment may already enable devices 10 and 130 to satisfactorily communicate wirelessly with each other (e.g., as described in connection with FIGS. 7 and 8). If desired, a single set of structures may bias device 10 to device 130 along the Z-axis but does not fix the relatively rotational orientation of devices 10 and 130 about the Z-axis.

At step 186, device 130 (e.g., control circuitry 132 in device 130) may detect the presence of device 10 and determine that wireless communications between devices 10 and 130 may be enabled. As an example, device 130 may operable in a device discovery mode, during which an antenna (e.g., one or more antenna elements on an antenna array) on device 130 may continually transmit and/or monitor the reception of radio-frequency signals (e.g., to and/or from device 10). When a response to a transmitted radio-frequency signals is received, device 130 may determine that device 10 is present and is ready for wireless communication. As another example, device 130, after detecting the physical presence of device 10, may trigger a wireless power wake-up signal useable to activate wireless power transmitting circuitry in device 130. The same wireless power wake-up signal may be used to prompt wireless communications between devices 10 and 130.

At step 188, device 130 (e.g., control circuitry 132 in devices 130) may determine one or more optimal antenna elements (e.g., on both devices 10 and 130). Using these one or more optimal antenna elements, devices 10 and 130 may establish a wireless communication link. In particular, device 130 may identify (e.g., receive, gather, and/or generate) corresponding performance metrics (sometimes referred to herein as wireless performance information) for each antenna element or each antenna element pair in device 130 when linked with a corresponding antenna element or corresponding antenna element pair in device 10. Device 130 may then compare the identified corresponding performance metrics to each other and/or to a performance metric threshold level. If desired, performance metrics may be identified in combination with step 186 (e.g., in the device discovery mode of operation for device 130).

These performance metrics may include received power, receiver sensitivity, receive band noise (e.g., a receive band noise floor voltage level), frame error rate, bit error rate, packet error rate, channel quality measurements based on received signal strength indicator (RSSI) information, adjacent channel leakage ratio (ACLR) information (e.g., ACLR information in one or more downlink frequency channels), channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, or any other suitable type of performance metrics.

As an example, one or both antenna resonating elements in pairs of antenna resonating elements in antenna 138-2 (FIG. 10) may transmit radio-frequency signals. One or both antenna resonating elements in pairs of antenna resonating elements in antenna 40-2 (FIG. 9) may receive the transmitted radio-frequency signals and in response transmit a response (radio-frequency) signal. This may occur sequentially for each pair of antenna resonating elements in antenna 138-2 and/or for each pair of antenna resonating elements in antenna 40-2. Signals from corresponding pairs of antenna resonating elements in antenna 138-2 may be used as measurements to obtain performance metrics based on the received response signal. If desired, testing may be performed for pairs of antenna resonating elements in a radial pattern (e.g., testing the pair of antenna elements that include elements 154-1 and 154-3, the pair of antenna elements that include elements 154-6 and 154-8, the pair of antenna elements that include elements 154-2 and 154-4, etc. in FIG. 9). If desired, during testing one or more (or all) of antenna resonating elements 172 may be operable to detect signals transmitted from each separate pair of antenna resonating elements 154.

This example is merely illustrative. If desired, any other testing scheme and/or performance metrics gathering scheme may be used to determine one or more optimal antenna resonating elements. While this example uses antennas 138-2 and 40-2, similar operations may use antennas 138-1 and 40-3 in addition to or instead of antenna 138-2 and 40-2.

At step 190, device 130 (e.g., control circuitry 132 in devices 130) may perform device pairing for wireless communications to establish the wireless communication link using the one or more optimal antenna elements on devices 10 and 130. As an example, device 130 may actively use optimal antenna resonating elements 174-1 and 174-3 and disable antenna resonating elements 174-2, 174-4, 174-5, 174-6, 174-7, and 174-8. Similarly, device 10 may actively use optimal antenna resonating elements 156-5 and 156-7 (which may be aligned with antenna resonating elements 174-1 and 174-3) and disable antenna resonating elements 156-1, 156-2, 156-3, 156-4, 156-6, and 156-8. If desired, device 130 may configure the wireless communication link to optimize for communication with device and/or for any suitable application for which the wireless communication link is established.

At step 192, device 130 may perform data transfer operations (as an example) with device 10 using the established wireless communication link. In particular, the established wireless communication link may be as a high data rate, bi-directional, and near-filed wireless communication link through which data transfer operations may be performed.

If desired, at step 194, device 130 (e.g., control circuitry 132 in devices 130) may (periodically) determine whether the one or more antenna elements selected in steps 188 remain optimal. If desired, step 194 may be performed when relative low amounts of data are being transferred between devices 10 and 130. If desired, step 194 may be performed at regular time intervals. If desired, step 194 may be performed when movement of at least one of devices 10 and/or 130 is detected. In response, devices 10 and 130 may re-establish the wireless communication link based on one or more updated and optimal antenna elements on devices 10 and/or 130. As an example, device 130 may perform step 188 to determine the one or more updated and optimal antenna elements. If desired, devices 130 may also (periodically) determine whether settings for the established wireless communication link should be updated and re-establish the wireless communication link using the updated settings.

These steps are merely illustrative. If desired, control circuitry 28 on device 10 (FIG. 6) may process one or more steps to determine optimal antenna resonating elements (instead of control circuitry 132 on device 130).

Figure 12:
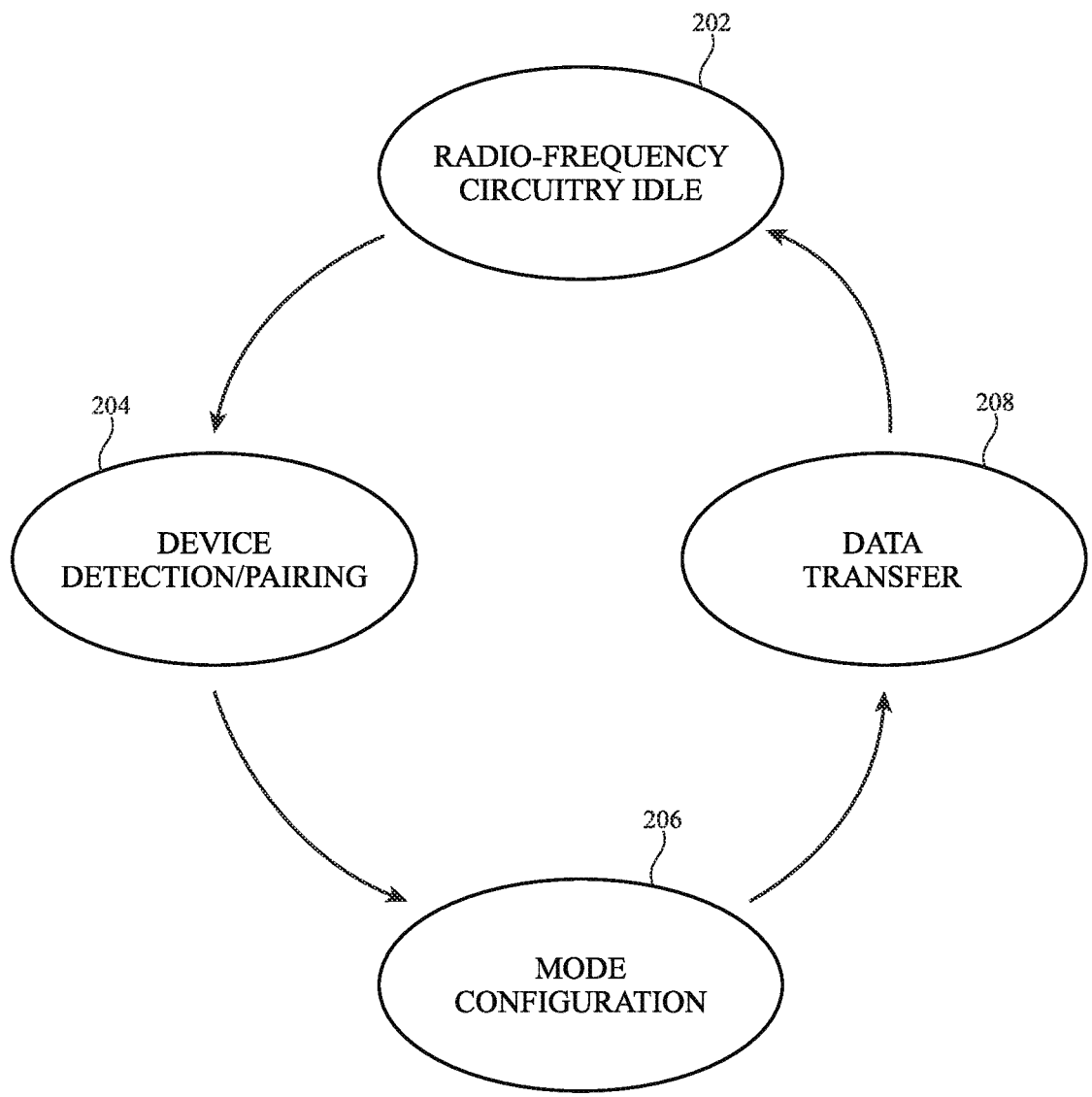
FIG. 12 is a diagram of illustrative states for an electronic device such as one of the electronic devices shown in FIGS. 8 and 10 in accordance with some embodiments.

FIG. 12 is a diagram of illustrative states (e.g., modes of operation) for device 130 (e.g., for wireless circuitry 134 and/or control circuitry 132 in FIG. 6) when performing data transfer operations with device 10. In particular, prior to any interaction with device 10, device 130 may be in a radio-frequency circuitry idle state 202, in which one or more portions or all of wireless circuitry 132 is inactive. In response to determining that device 10 is nearby (e.g., adjacent to device 130), device 130 may be in a device detection and pairing state 204, in which device 130 may determine an optimal set of antenna elements both on device 130 and on device 10 through which device pairing and an establishment of a wireless communication link may occur (e.g., steps 186-190 in FIG. 11). After pairing device 130 with device 10, device 130 may be in a mode configuration state 206, in which device 130 may configure settings (e.g., use application-specific protocols, tune antenna elements, switch between different duplexing modes, determine transmit power, etc.) for the established wireless communication link. After the wireless communication link is configured, device 130 may be in a data transfer state 208, during which data may be freely conveyed between devices 130 and 10 (e.g., step 192 in FIG. 11). Device 130 may return to idle state 202 when device 10 is removed from the proximity of device 130, when data transfer operations are no longer necessary, etc.

In an exemplary configuration, a user may place the first device onto the second device without having to focus on perfectly aligning the first device to the second device (e.g., about the Z-axis). In a first example, the alignment or attachment structures may exhibit forces that automatically align the first and second devices when the first device is placed onto the second device, thereby aligning the wireless circuitries (e.g., antennas) of the first and second devices and configuring the first and second devices to form a reliable wireless communication link. In a second example, the first and/or second device may determine one or more optimal antenna elements or pairs of antenna elements in antenna arrays on the first and second devices based on the imperfectly aligned orientation between the first and second devices. The one or more optimal antenna elements or pairs of antenna elements in antenna arrays on the first and second devices may then be used to form a reliable wireless communication link.

By providing alignment or attachment structures and/or antenna arrays on first and second communicating devices (e.g., as described in connection with FIGS. 6-12), high data rate, near-field wireless communication links may be robustly established between the first and second communicating devices.

The foregoing is merely illustrative and various modifications can be made to the described embodiments. The foregoing embodiments may be implemented individually or in any combination.

What is claimed is:

1. An electronic device having first and second faces comprising:
a display at the first face;
a housing having a housing wall at the second face;
first and second antenna resonating elements that overlap the housing wall and that are operable to convey radiofrequency signals at a frequency above 10 GHz through the housing wall; and
magnetic structures disposed in the housing and configured to apply a magnetic force through the housing wall to fix a position of the electronic device relative to external equipment.

2. The electronic device defined in claim 1, wherein the magnetic structures comprise a first magnet that overlaps the housing wall at a first location and a second magnet that overlaps the housing wall at a second location.

3. The electronic device defined in claim 2, wherein the first and second magnets are configured to bias the housing wall against the external equipment and to align the first and second antenna resonating elements with corresponding antenna elements on the external equipment.

4. The electronic device defined in claim 1 further comprising:
near-field communications circuitry coupled to the first and second antenna resonating elements and configured to use the first and second antenna resonating elements to convey the radio-frequency signals at the frequency above 10 GHz through the housing wall.

5. The electronic device defined in claim 4 further comprising:
a substrate disposed between the display and the housing wall, the first and second antenna resonating elements being formed at the substrate.

6. The electronic device defined in claim 1 further comprising:
an additional antenna resonating element that overlaps the housing wall and that is operable to convey additional radio-frequency signals at an additional frequency below 10 GHz through the housing wall, wherein the additional antenna resonating element at least partly defines an antenna aperture and the first antenna resonating element is aligned with the antenna aperture.

7. The electronic device defined in claim 1 further comprising:
a sensor module, wherein the magnetic structures are disposed on opposing sides of the sensor module;
a coil structure that surrounds the sensor module; and
wireless power receiving circuitry coupled to the coil structure and configured to use the coil structure to receive wireless power signals through the housing wall.

8. The electronic device defined in claim 7, wherein the housing wall is a rear housing wall, the first and second antenna resonating elements form an antenna array, and the magnetic structures are configured to bias the electronic device against the external equipment with the magnetic force.

9. The electronic device defined in claim 1, wherein the electronic device is a wristwatch device, the first and second faces are opposing faces, and the first and second antenna resonating elements form an antenna array, the electronic device further comprising:
radio-frequency transceiver circuitry coupled to the first and second antenna resonating elements and configured to use the first and second antenna resonating elements to convey the radio-frequency signals at the frequency above 10 GHz through the housing wall.

10. A wristwatch device having first and second opposing faces comprising:
a display at the first face;
a rear housing member at the second face;
an antenna array having a plurality of antenna resonating elements that overlap the rear housing member;
radio-frequency transceiver circuitry coupled to the plurality of antenna resonating elements and configured to convey radio-frequency signals at a frequency above 10 GHz through the rear housing member using the plurality of antenna resonating elements; and alignment structures configured to apply a force across the rear housing member to fix a position of the wristwatch device relative to external equipment.

11. The wristwatch device defined in claim 10, wherein the plurality of antenna resonating elements are circumferentially distributed about an axis.

12. The wristwatch device defined in claim 11 further comprising:
sensor circuitry, wherein the plurality of antenna resonating elements surround the sensor circuitry; and
a coil that surrounds the sensor circuitry.

13. The wristwatch device defined in claim 10, wherein the radio-frequency transceiver circuitry comprises near-field communications circuitry, the near-field communications circuitry being configured to convey the radio-frequency signals at the frequency above 10 GHz through the rear housing member using the plurality of antenna resonating elements.

14. The wristwatch device defined in claim 13, wherein the near-field communications circuitry is configured to convey the radio-frequency signals at the frequency above 10 GHz through the rear housing member using only a subset of the plurality of antenna resonating elements at a given time.

15. The wristwatch device defined in claim 13, wherein the near-field communications circuitry is configured to convey the radio-frequency signals at the frequency above 10 GHz through the rear housing member using a first pair of the antenna resonating elements in the plurality of antenna resonating elements at a first time and a second pair of the antenna resonating elements in the plurality of antenna resonating elements at a second time.

16. The wristwatch device defined in claim 10 further comprising:
a backside circuitry module having a substrate, to which the radio-frequency transceiver circuitry is mounted, wherein the plurality of antenna resonating elements are formed at the substrate.

17. The wristwatch device defined in claim 10 further comprising:
control circuitry; and
a printed circuit substrate to which the control circuitry and the radio-frequency transceiver circuitry are mounted, wherein the plurality of antenna resonating elements are formed at the printed circuit substrate.

18. An electronic device comprising:
a housing having a rear housing wall;
a coil structure;

wireless power receiving circuitry coupled to the coil structure and configured to use the coil structure to receive wireless power signals through the rear housing wall;

a plurality of antenna elements for an antenna array operable to convey radio-frequency signals through the rear housing wall; and alignment structures configured to bias the electronic device toward external equipment with a force applied across the rear housing wall to fix a position of the electronic device relative to the external equipment.

19. The electronic device defined in claim 18 further comprising:
near-field communications circuitry coupled to the antenna array and configured to use the antenna array to convey the radio-frequency signals at a frequency above 10 GHz.

20. The electronic device defined in claim 18 further comprising:
a display; and
a substrate disposed between the display and the rear housing wall, wherein at least a portion of the plurality of antenna elements are embedded within the substrate.

* * * * *